US012638542B1

(12) United States Patent
Wichgers

(10) Patent No.: US 12,638,542 B1
(45) Date of Patent: May 26, 2026

(54) SYSTEM INCLUDING NODE CONFIGURED TO DETERMINE POSITION AND/OR TIME OF NODE BASED AT LEAST ON ANGLE MEASUREMENTS OF SIGNALS FROM OTHER NODES AND METHOD THEREFOR

(71) Applicant: Rockwell Collins, Inc., Cedar Rapids, IA (US)

(72) Inventor: Joel M. Wichgers, Urbana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 324 days.

(21) Appl. No.: 18/431,741

(22) Filed: Feb. 2, 2024

(51) Int. Cl.
    *G01S 5/02* (2010.01)
(52) U.S. Cl.
    CPC .......... *G01S 5/0289* (2013.01); *G01S 5/0221* (2013.01)
(58) Field of Classification Search
    CPC .............................. G01S 5/0289; G01S 5/0221
    See application file for complete search history.

(56) References Cited

U.S. PATENT DOCUMENTS

| | | | |
|---|---|---|---|
| 3,796,989 | A | 3/1974 | Johnston et al. |
| 8,599,956 | B1 | 12/2013 | Mitchell |
| 9,883,348 | B1 | 1/2018 | Walker et al. |
| 10,194,269 | B2 | 1/2019 | Venkataraman et al. |
| 10,281,560 | B2 | 5/2019 | Xue et al. |
| 10,568,064 | B2 | 2/2020 | Seth et al. |
| 10,948,566 | B1 | 3/2021 | Harbin et al. |
| 11,280,874 | B2 | 3/2022 | Fortney |
| 11,280,896 | B2 | 3/2022 | Hawker et al. |
| 11,412,347 | B2 | 8/2022 | Demirdag et al. |
| 11,665,658 | B1 | 5/2023 | Sorsby et al. |
| 2010/0323723 | A1* | 12/2010 | Gerstenberger ...... G01S 5/0226 455/456.5 |
| 2012/0086596 | A1 | 4/2012 | Insanic et al. |
| 2016/0118716 | A1 | 4/2016 | Stephenne et al. |
| 2021/0088622 | A1 | 3/2021 | Nishimoto |

(Continued)

FOREIGN PATENT DOCUMENTS

| | | |
|---|---|---|
| EP | 2988146 A1 | 2/2016 |
| EP | 3273271 B1 | 6/2023 |

(Continued)

OTHER PUBLICATIONS

U.S. Appl. No. 18/388,670, filed Nov. 10, 2023, Joel M. Wichgers.

(Continued)

*Primary Examiner* — Robert W Hodge
*Assistant Examiner* — Bongani Jabulani Mashele
(74) *Attorney, Agent, or Firm* — Suiter Swantz IP

(57) ABSTRACT

A system includes a node configured to: receive a first signal from a first other node; obtain or determine a position of the first other node based at least on the first signal; receive a second signal from a second other node; obtain or determine a position of the second other node based at least on the second signal; obtain or determine (a) a first angle measurement of a first angle between the node and the first other node and (b) a second angle measurement of a second angle between the node and the second other node; determine a boundary of position (BoP) containing points of possible positions of the node; and based at least on the BoP, determine a position of the node.

20 Claims, 12 Drawing Sheets

(56)                  References Cited

U.S. PATENT DOCUMENTS

| | | |
|---|---|---|
| 2021/0255333 A1 | 8/2021 | Sornin et al. |
| 2022/0365165 A1 | 11/2022 | Kirchner et al. |
| 2023/0009717 A1 | 1/2023 | Bilstad et al. |
| 2023/0118390 A1 | 4/2023 | Ninos et al. |
| 2023/0229175 A1 | 7/2023 | Squillace et al. |

FOREIGN PATENT DOCUMENTS

| | | | |
|---|---|---|---|
| GB | 2542491 | A | 3/2017 |
| WO | 2022106139 | A3 | 5/2022 |
| WO | 2022155436 | A1 | 7/2022 |
| WO | 2022221429 | A1 | 10/2022 |
| WO | 2022226233 | A1 | 10/2022 |
| WO | 2023096950 | A1 | 6/2023 |

OTHER PUBLICATIONS

U.S. Appl. No. 18/388,681, filed Nov. 10, 2023, Joel M. Wichgers.

* cited by examiner $\theta_{AB} = \theta_B - \theta_A;\quad \theta_{AC} = \theta_C - \theta_A;\quad \theta_{BC} = \theta_C - \theta_B;$ $\theta_A \text{ (Measured)} = \theta_{A\_true} + \text{Error A}$
$\theta_B \text{ (Measured)} = \theta_{B\_true} + \text{Error B}$
$\theta_C \text{ (Measured)} = \theta_{C\_true} + \text{Error C}$

PARALLEL TO Y AXIS IN XY PLANE

CIRCLE IN
HORIZONTAL PLANE

PARALLEL TO Y AXIS IN XZ PLANE

304-A

304-B

X

Y

Z

45°

CIRCLE IN
HORIZONTAL PLANE,
PROJECT TO ELLIPSE

1100

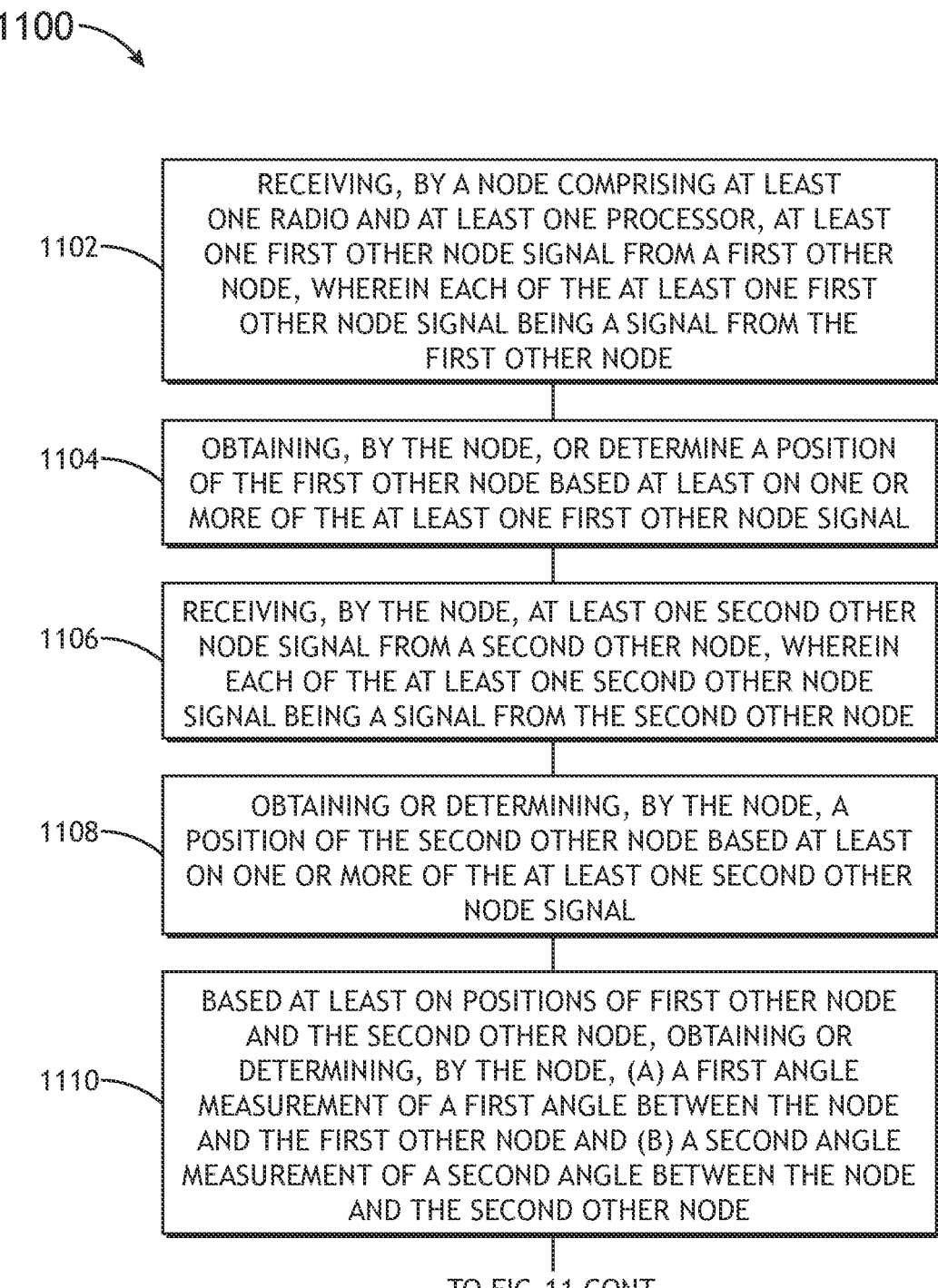

1102 — RECEIVING, BY A NODE COMPRISING AT LEAST ONE RADIO AND AT LEAST ONE PROCESSOR, AT LEAST ONE FIRST OTHER NODE SIGNAL FROM A FIRST OTHER NODE, WHEREIN EACH OF THE AT LEAST ONE FIRST OTHER NODE SIGNAL BEING A SIGNAL FROM THE FIRST OTHER NODE

1104 — OBTAINING, BY THE NODE, OR DETERMINE A POSITION OF THE FIRST OTHER NODE BASED AT LEAST ON ONE OR MORE OF THE AT LEAST ONE FIRST OTHER NODE SIGNAL

1106 — RECEIVING, BY THE NODE, AT LEAST ONE SECOND OTHER NODE SIGNAL FROM A SECOND OTHER NODE, WHEREIN EACH OF THE AT LEAST ONE SECOND OTHER NODE SIGNAL BEING A SIGNAL FROM THE SECOND OTHER NODE

1108 — OBTAINING OR DETERMINING, BY THE NODE, A POSITION OF THE SECOND OTHER NODE BASED AT LEAST ON ONE OR MORE OF THE AT LEAST ONE SECOND OTHER NODE SIGNAL

1110 — BASED AT LEAST ON POSITIONS OF FIRST OTHER NODE AND THE SECOND OTHER NODE, OBTAINING OR DETERMINING, BY THE NODE, (A) A FIRST ANGLE MEASUREMENT OF A FIRST ANGLE BETWEEN THE NODE AND THE FIRST OTHER NODE AND (B) A SECOND ANGLE MEASUREMENT OF A SECOND ANGLE BETWEEN THE NODE AND THE SECOND OTHER NODE

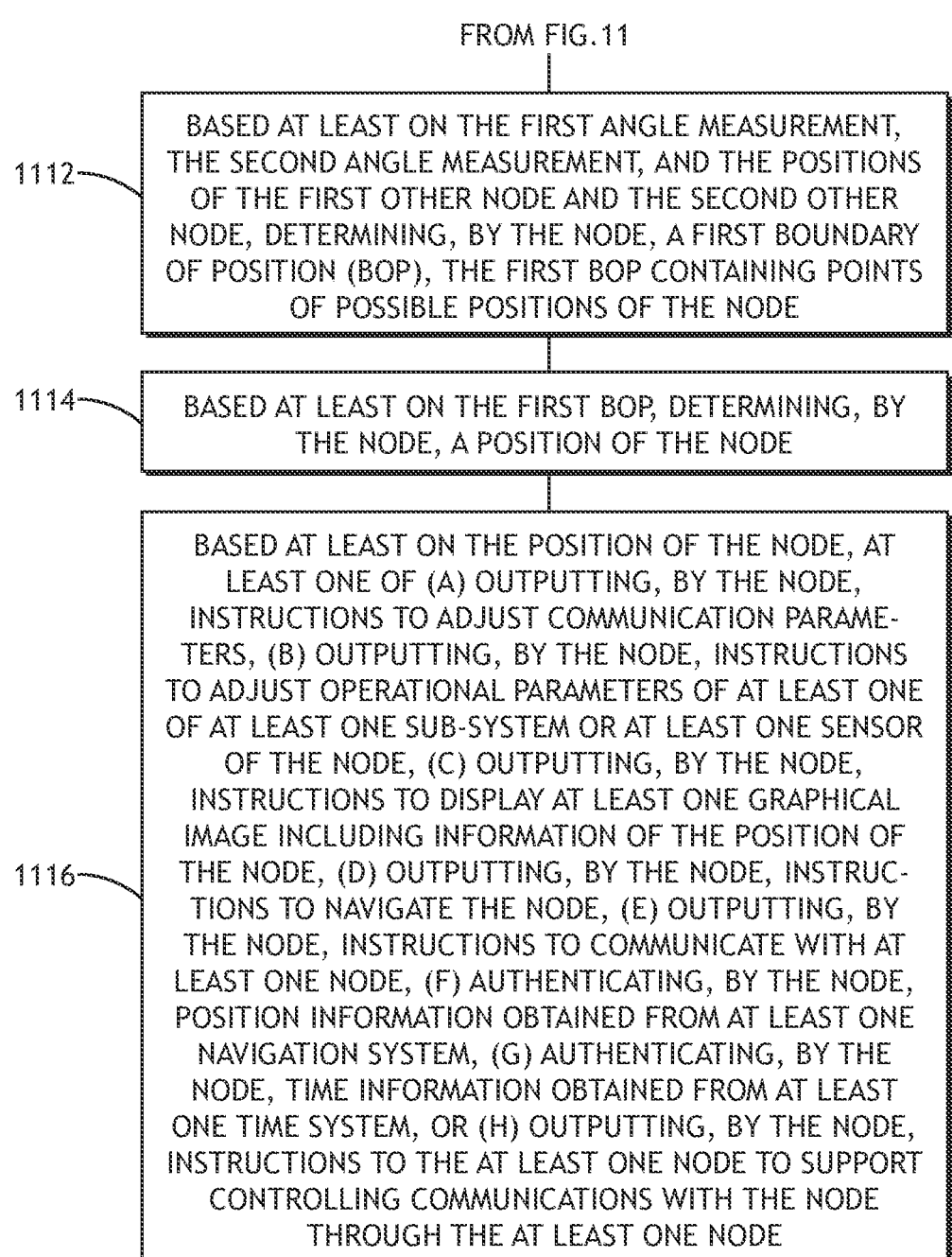

FROM FIG.11

1112 — BASED AT LEAST ON THE FIRST ANGLE MEASUREMENT, THE SECOND ANGLE MEASUREMENT, AND THE POSITIONS OF THE FIRST OTHER NODE AND THE SECOND OTHER NODE, DETERMINING, BY THE NODE, A FIRST BOUNDARY OF POSITION (BOP), THE FIRST BOP CONTAINING POINTS OF POSSIBLE POSITIONS OF THE NODE

1114 — BASED AT LEAST ON THE FIRST BOP, DETERMINING, BY THE NODE, A POSITION OF THE NODE

1116 — BASED AT LEAST ON THE POSITION OF THE NODE, AT LEAST ONE OF (A) OUTPUTTING, BY THE NODE, INSTRUCTIONS TO ADJUST COMMUNICATION PARAMETERS, (B) OUTPUTTING, BY THE NODE, INSTRUCTIONS TO ADJUST OPERATIONAL PARAMETERS OF AT LEAST ONE OF AT LEAST ONE SUB-SYSTEM OR AT LEAST ONE SENSOR OF THE NODE, (C) OUTPUTTING, BY THE NODE, INSTRUCTIONS TO DISPLAY AT LEAST ONE GRAPHICAL IMAGE INCLUDING INFORMATION OF THE POSITION OF THE NODE, (D) OUTPUTTING, BY THE NODE, INSTRUCTIONS TO NAVIGATE THE NODE, (E) OUTPUTTING, BY THE NODE, INSTRUCTIONS TO COMMUNICATE WITH AT LEAST ONE NODE, (F) AUTHENTICATING, BY THE NODE, POSITION INFORMATION OBTAINED FROM AT LEAST ONE NAVIGATION SYSTEM, (G) AUTHENTICATING, BY THE NODE, TIME INFORMATION OBTAINED FROM AT LEAST ONE TIME SYSTEM, OR (H) OUTPUTTING, BY THE NODE, INSTRUCTIONS TO THE AT LEAST ONE NODE TO SUPPORT CONTROLLING COMMUNICATIONS WITH THE NODE THROUGH THE AT LEAST ONE NODE

FIG.11 CONT.

SYSTEM INCLUDING NODE CONFIGURED TO DETERMINE POSITION AND/OR TIME OF NODE BASED AT LEAST ON ANGLE MEASUREMENTS OF SIGNALS FROM OTHER NODES AND METHOD THEREFOR

BACKGROUND

Currently, two-way timing and ranging (TWTR) involves transmitting signals between two or more nodes to enable the determination of relative and/or absolute position information and/or the transfer of time information. TWTR involves an ownship node transmitting a first TWTR signal (which may be an example of an interrogation message, an interrogation signal(s), or a first signal(s)), which is received by one or more additional nodes, and those additional nodes send a second TWTR signal (which may be an example of a response message, a reply signal(s), or a second signal(s)) to the ownship node's first signal(s).

Currently, the ownship node can determine two-way range by measuring a delta time between a transmission of the interrogation signal and the receipt of the reply signal, by knowing the time delay that each reply node used between receipt of the interrogation signal and the transmission of reply node's reply signal. Also, as part of the reply signal, if timing information is communicated from the node replying, then the ownship node can determine the time as known by the reply node.

Currently, TWTR may be suitable in some situations to be able to determine time information, determine relative position information, and even determine absolute position information if the position of the reply node is known and either the direction to the reply node is known or there are multiple reply nodes that have communicated their positions. The communication of position by the reply node can be done explicitly as part of the reply signal, or the position of the reply node may be known by the ownship node (e.g., reply node is at a fixed position known to the ownship node), or the position of the reply node can be determined or estimated by the ownship node (e.g., reply node position can be predicted using an equations of motion model).

Currently, TWTR can be used to determine precise relative position information, absolute position information, and/or time information of an ownship node, which can be useful in contested environments, whereby, for instance, a global navigation satellite system (GNSS) (e.g., global positioning system (GPS)) or other navigation systems may be denied (e.g., jammed) or may be spoofed.

TWTR transmissions (e.g., both interrogations and replies) can use, for example, signals that have significantly higher power than other navigation signals (like GPS), directional communications, spread spectrum, frequency hopping, etc. and other techniques for robust and efficient communications as well as for positioning and/or time transfer between nodes.

Currently, one problem with TWTR is that it requires radiofrequency (RF) emissions from an ownship node to achieve TWTR benefits (e.g., alternative source of position, navigation, and timing (PNT)). Emitting RF energy (e.g., via interrogation and/or reply signals) to determine and maintain position can be undesirable in contested environments, where hostile forces can more easily detect, identify, locate, and/or target the ownship node. For example, in highly contested environments, the military often wants nodes to operate with Emission Control (EMCON) (e.g., radio silence or very limited emissions). Furthermore, emitting TWTR signals (e.g., interrogations and replies) even in permissive environments (e.g., where GPS is received but TWTR is used for assurance) can lead to unnecessary RF congestion, especially as the number of nodes increases.

SUMMARY

In one aspect, embodiments of the inventive concepts disclosed herein are directed to a system. The system may include a node including at least one radio and at least one processor. The node may be configured to: receive at least one first other node signal from a first other node, wherein each of the at least one first other node signal being a signal from the first other node; obtain or determine a position of the first other node based at least on one or more of the at least one first other node signal; receive at least one second other node signal from a second other node, wherein each of the at least one second other node signal being a signal from the second other node; obtain or determine a position of the second other node based at least on one or more of the at least one second other node signal; based at least on positions of first other node and the second other node, obtain or determine (a) a first angle measurement of a first angle between the node and the first other node and (b) a second angle measurement of a second angle between the node and the second other node; based at least on the first angle measurement, the second angle measurement, and the positions of the first other node and the second other node, determine a first boundary of position (BoP), the first BoP containing points of possible positions of the node; based at least on the first BoP, determine a position of the node; and based at least on the position of the node, at least one of (a) output instructions to adjust communication parameters, (b) output instructions to adjust operational parameters of at least one of at least one sub-system or at least one sensor of the node, (c) output instructions to display at least one graphical image including information of the position of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

In a further aspect, embodiments of the inventive concepts disclosed herein are directed to a node. The node may be configured to: receive at least one first other node signal from a first other node, wherein each of the at least one first other node signal being a signal from the first other node; obtain or determine a position of the first other node based at least on one or more of the at least one first other node signal; receive at least one second other node signal from a second other node, wherein each of the at least one second other node signal being a signal from the second other node; obtain or determine a position of the second other node based at least on one or more of the at least one second other node signal; based at least on positions of first other node and the second other node, obtain or determine (a) a first angle measurement of a first angle between the node and the first other node and (b) a second angle measurement of a second angle between the node and the second other node; based at least on the first angle measurement, the second angle measurement, and the positions of the first other node and the second other node, determine a first boundary of position (BoP), the first BoP containing points of possible positions of the node; based at least on the first BoP, determine a position of the node; and based at least on the position of the node, at least one of (a) output instructions to adjust communication parameters, (b) output instructions to adjust operational parameters of at least one of at least one sub-system or at least one sensor of the node, (c) output instructions to display at least one graphical image including information of the position of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

In a further aspect, embodiments of the inventive concepts disclosed herein are directed to a method. The method may include: receiving, by a node comprising at least one radio and at least one processor, at least one first other node signal from a first other node, wherein each of the at least one first other node signal being a signal from the first other node; obtaining, by the node, or determine a position of the first other node based at least on one or more of the at least one first other node signal; receiving, by the node, at least one second other node signal from a second other node, wherein each of the at least one second other node signal being a signal from the second other node; obtaining or determining, by the node, a position of the second other node based at least on one or more of the at least one second other node signal; based at least on positions of first other node and the second other node, obtaining or determining, by the node, (a) a first angle measurement of a first angle between the node and the first other node and (b) a second angle measurement of a second angle between the node and the second other node; based at least on the first angle measurement, the second angle measurement, and the positions of the first other node and the second other node, determining, by the node, a first boundary of position (BoP), the first BoP containing points of possible positions of the node; based at least on the first BoP, determining, by the node, a position of the node; and based at least on the position of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the position of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 11 is a diagram of an exemplary embodiment of a method according to the inventive concepts disclosed herein.

DETAILED DESCRIPTION

Figure 1:
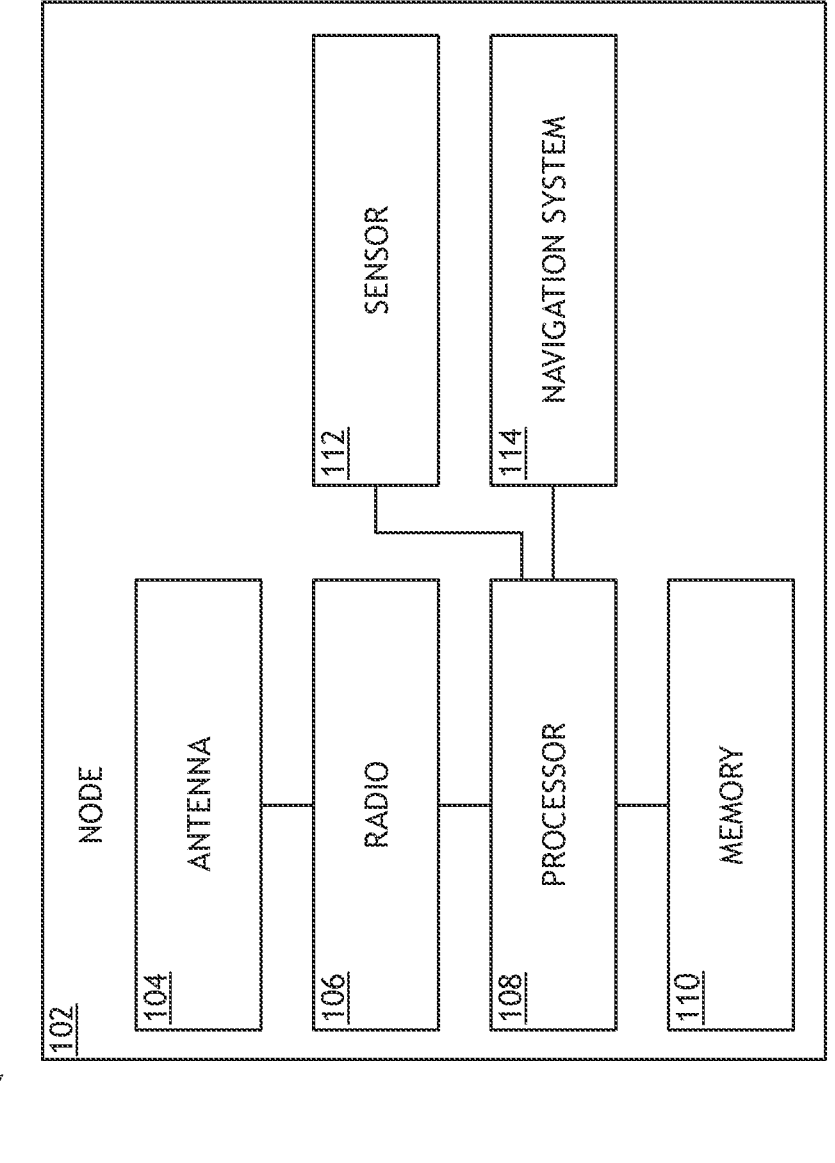
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and they should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including a node configured to determine a position of the node and/or a time of the node based at least on angle measurements of signals from other nodes.

Some embodiments may achieve the benefits of TWTR. Some embodiments may determine and/or maintain precise position information and/or time information, such as for nodes in contested environments, without an RF emission from an ownship node. Some embodiments may achieve the benefits of TWTR for all nodes in the network with only two or more nodes in the network transmitting TWTR interrogations and replies.

Some embodiments may include a method and/or a system configured for emission-less TWTR. For example, an ownship node may perform passive TWTR functions without ownship RF emissions such as by listening (e.g., passively listening) to TWTR transmissions from other active TWTR nodes.

In some embodiments, one or more nodes can determine precise position information (e.g., relative and/or absolute position) and time information (e.g., time transfer and/or time synchronization) by listening to active TWTR emissions from other nodes, while the one or more nodes do not emit any TWTR interrogations or replies. Some embodiments enable most of the nodes in the network to determine their own position and time synchronization across a network by listening and processing the information received from a few nodes in the network actively performing TWTR interrogations and replies. Some embodiments may provide a highly advantageous use-case for contested environments, whereby nodes can determine and maintain precise position information and time information without emitting RF energy (via TWTR). For example, most nodes can perform emission-less TWTR using the interrogations and replies of other nodes in the network (which could be positioned outside of the highly contested environment, or within the contested environment as attritable nodes (e.g., low-cost unmanned aerial vehicles (UAVs) with acceptably higher risk of loss tolerance)). For example, some embodiments may be highly advantageous for nodes in a contested environment under Emission Control (EMCON), which is a military state of minimal radio emissions.

In some embodiments, an ownship node may be configured to determine an ownship node position information and time information by listening (e.g., passively listening) to other nodes actively performing TWTR. For example, passively listening may allow the ownship node to avoid transmitting RF emissions (e.g., which may be important for military aircraft in contested environments, where EMCON is often used to avoid detection and targeting; and/or e.g., which may reduce RF congestion in commercial and/or military networks), while still being able to determine position information and/or time information (e.g., which may be especially important if GNSS (e.g., GPS) positioning and/or timing is jammed or otherwise unavailable).

In some embodiments, emission-less TWTR (ETWTR) position and time determination can be used to authenticate GNSS (or other navigation systems) position and/or time determination (e.g., for spoofing detection and mitigation). In some embodiments, ETWTR can be used to establish or maintain position information and/or time information of nodes across a network (e.g., a commercial and/or military network), which may be important for networked communications (e.g., directional, time slotted, authenticated communications, etc.). In some embodiments, ETWTR can significantly reduce the number of active TWTR nodes necessary for TWTR transmissions to maintain a synchronized time (e.g., a network time) and positions of the nodes, which may be very important to mitigate the amount of RF bandwidth and/or spectrum resources, power associated with emissions, equipment reliability (e.g., fewer emissions), etc.

Some embodiments may enable military concepts of operations to maintain precise position and time. For example, high value nodes in a contested environment may be configured to remain silent without emitting RF energy while gaining the benefit of determining a position and time of their ownship high value node; TWTR emissions can be limited to nodes in more permissive environments and/or attritable nodes (e.g., relatively lower value nodes compared to the high value nodes) in the contested environment so as to mitigate risk to high value nodes associated with RF emissions. Another possible military concept of operation is where "fragile" nodes, which are more vulnerable to an adversary, may be configured to remain silent without emitting RF energy associated with TWTR emissions while gaining the benefit of determining ownship node position information and time information, while "protected" nodes, which are less susceptible to being disabled or destroyed by the adversary (e.g., due to location outside the contested zone in a more permissive environment, or within the contested zone but fortified with armor or other means of robustness), may be configured for active TWTR emissions.

In some embodiments, an unlimited number of passive ETWTR listener nodes can hear TWTR emissions from two or more active TWTR node pairs (e.g., with suitable geometry relative to the ETWTR listener nodes) such that each of the passive ETWTR listener nodes may be configured to determine own node position information and time information.

In some embodiments, the ownship node may determine its position information and/or time information using a combination of one or more BoPs determined using ETWTR (emission less TWTR listening to one or more node pairs) and/or one or more sets of position and/or time information determined using active TWTR between the ownship node and one or more other nodes.

As used herein, boundary of position (BoP) is defined to be a set of all possible locations on which a node is expected to be located based upon a single set of observations. The intersection of multiple (two or more) boundaries of position obtained from multiple sets of observations can be used to establish a node's location. In some embodiments, the intersection of one or more boundaries of position can be used in combination with other information (e.g., altitude, horizontal position, and/or velocity) about a node to establish a node's location. When used with a navigation state estimator (e.g., Kalman filter, extended Kalman filter, least squares estimator) that takes and weights observations over time, additional node state information in addition to position (e.g., velocity, acceleration, jerk, attitude, and/or altitude) may be determined. BoP is a concept similar to, and often equivalently referred to as, line of position (LOP), which is frequently used in navigation literature. LOP is defined by Merriam-Webster on-line dictionary (viewed on Sep. 27, 2023) as: "a locus of all possible positions of a ship for the conditions given" and "a line along which an aircraft is known (as by ground reference or celestial fix) to be flying and which when crossed with another line of position will establish the precise position of the aircraft." LOP is also defined by Dictionary.com (viewed on Sep. 27, 2023) as: "a line connecting all the possible positions of a ship or aircraft, as determined by a single observation." The term "boundary of position" is being used herein because the standard LOP definitions are too narrowly focused to only determining positions of ships or aircraft, LOP tends to be interpreted as straight lines rather than potentially curved lines (e.g., circle, ellipse, hyperbolic curves) or curved surfaces, in addition to straight lines, and because the notion of a "single observation" is too constraining for this application since a set of observations from TWTR interrogation and reply messages between two nodes are used to determine one BoP.

As used herein, the term "position information" may refer to information associated with position (which may be in any of various formats, like absolute position relative to an established reference system (e.g., World Geodetic Survey 1984 (WGS-84)), and/or relative position between nodes), and "position information" may include information of one or more other absolute or relative position states of the node, such as velocity, acceleration, and/or jerk.

As used herein, the term "time information" may refer to information associated with time (which may be in any of various formats, like absolute time relative to an established reference system (e.g., Universal Time Coordinated (UTC)), and/or relative time between nodes), and "time information" may include information of one or more other absolute or relative time states of the node, such as time bias, time drift rate, and/or rate of change of time drift rate.

Referring now to FIGS. 1-9, an exemplary embodiment of a system 100 according to the inventive concepts disclosed herein is depicted. The system 100 may be implemented as any suitable system, such as a network (e.g., an RF-based network, a wireless network, a mobile ad hoc network (MANET), a mobile network (e.g., a 4G or a 5G network), or sonar network). The system 100 may include a plurality of nodes 102 (e.g., node 102-O (which may refer to an ownship node), node 102-A, and/or node 102-B), some or all of which may be communicatively coupled at any given time.

In some embodiments, the node 102 (e.g., 102-O) and one or more of other nodes 102 (e.g., 102-A, 102-B, and/or 102-C) may be in relative motion. In some embodiments, the node 102 (e.g., 102-O) and/or at least one of the other nodes 102 (e.g., 102-A, 102-B, and/or 102-C) may be stationary in a reference frame.

Each node 102 (e.g., 102-O (which may refer to an ownship node), 102-A, 102-B, 102-C) may be any suitable node, such as a vehicle (e.g., an aircraft (e.g., a manned aircraft or a UAV (e.g., an attritable UAV)), a watercraft, a submersible craft, an automobile, a spacecraft, a satellite, and/or a train), a manpack, a projectile, a mobile device (e.g., a mobile phone and/or a laptop computing device), a building, a structure, a sensor, or a platform (e.g., a radio tower). As shown in FIG. 1, each node 102 may include at least one antenna 104, at least one radio 106 (e.g., at least one software-defined radio (SDR)), at least one processor 108, at least one memory 110, at least one sensor 112 (e.g., at least one electro-optical/infrared (EO/IR) sensor, at least one radar sensor, and/or at least one light detection and ranging (LIDAR) sensor), and/or at least one navigation system 114 (e.g., at least one GNSS device (e.g., at least one GPS device), at least one altimeter, at least one radar, at least one LIDAR, at least one electro-optical/infrared (EO/IR) sensor, at least one magnetic anomaly sensor, at least one terrain database, at least one distance measuring equipment (DME), at least one tactical air navigation system (TACAN), at least one long-range navigation (LORAN) system, at least one sound navigation and ranging (SONAR) navigation system, at least one navigation system that uses low earth orbit (LEO) satellites, and/or at least one inertial navigation system (e.g., at least one Ring Laser Gyro, at least one Inertial Measurement Unit (IMU), at least one Fiber Optic Gyro (FOG), and/or at least one Micro-Electromechanical System (MEMS)), some or all of which may be communicatively coupled at any given time. For example, each radio 106 may be configured to communicate via any suitable waveform(s). In some embodiments, the radio 106 includes one or more of the antennas 104. For example, the at least one antenna 104, the at least one radio 106, the at least one processor 108, the at least one memory 110, the at least one sensor 112, and/or the at least one navigation system 114 may be configured to perform (e.g., collectively perform if more than one radio, more than one antenna, more than one radio, more than one processor, more than one memory, more than one sensor, and/or more than one navigation system) any or all of the operations disclosed throughout. For example, the at least one processor 108 may be configured to perform (e.g., collectively perform if more than one processor) any or all of the operations disclosed throughout. The at least one processor 108 may be configured to run various software applications or computer code stored (e.g., maintained) in a non-transitory computer-readable medium (e.g., memory 110) and configured to execute various instructions or operations. For example, the at least one processor 108 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 108 may include a CPU and/or an FPGA configured to perform (e.g., collectively perform) any of the operations disclosed throughout.

In some embodiments, the node 102 (e.g., 102-O) may be configured to: receive at least one first other node signal (e.g., at least one emitted signal and/or at least one reflected signal, wherein the at least one signal may be at least one of at least one electromagnetic signal (e.g., at least one RF signal, at least one optical signal (e.g., at least one visible spectrum signal and/or at least one invisible spectrum signal (e.g., at least one infrared (IR) signal and/or at least one ultraviolet (UV) signal); e.g., at least one laser signal)) and/or at least one pressure wave signal (e.g., at least one sound signal) such that the at least one signal is emitted from and/or reflected off of another node 102 (e.g., 102-A, 102-B, or 102-C) at least in part toward the node 102 (e.g., 102-O; e.g., at least one radio, at least one antenna, at least one EO/IR sensor, at least one radar sensor, and/or at least one LIDAR sensor of the node 102-O)) from a first other node 102 (e.g., 102-A), wherein each of the at least one first other node signal being a signal from the first other node 102 (e.g., 102-A); obtain or determine a position of the first other node 102 (e.g., 102-A) based at least on one or more of the at least one first other node signal; receive at least one second other node signal (e.g., at least one emitted signal and/or at least one reflected signal, wherein the at least one signal may be at least one of at least one electromagnetic signal and/or at least one pressure wave signal such that the at least one signal is emitted from and/or reflected off of another node 102 (e.g., 102-A, 102-B, or 102-C) at least in part toward the node 102 (e.g., 102-O)) from a second other node 102 (e.g., 102-B), wherein each of the at least one second other node signal being a signal from the second other node 102 (e.g., 102-B); obtain or determine a position of the second other node 102 (e.g., 102-B) based at least on one or more of the at least one second other node signal; based at least on positions of first other node 102 (e.g., 102-A) and the second other node 102 (e.g., 102-B), obtain or determine (a) a first angle measurement of a first angle between the node 102 (e.g., 102-O) and the first other node 102 (e.g., 102-A) and (b) a second angle measurement of a second angle between the node 102 (e.g., 102-O) and the second other node 102 (e.g., 102-B); based at least on the first angle measurement, the second angle measurement, and the positions of the first other node 102 (e.g., 102-A) and the second other node 102 (e.g., 102-B), determine a first boundary of position (BoP) 304 (e.g., 304-A), the first BoP 102 (e.g., 102-A) containing points of possible positions of the node 102 (e.g., 102-O); based at least on the first BoP 304 (e.g., 304-A), determine a position of the node 102 (e.g., 102-O); and/or based at least on the position of the node 102 (e.g., 102-O), at least one of (a) output instructions to adjust communication parameters (e.g., adjust a power gain, steer an electronically scanned array (ESA, such as an active ESA (AESA)) or a directional antenna, and/or adjust frequency), (b) output instructions to adjust operational parameters of at least one of at least one sub-system (e.g., a radar system (e.g., a weather radar system)) or at least one sensor 112 of the node, (c) output instructions to display at least one graphical image including information of the position of the node, (d) output instructions to navigate the node 102 (e.g., 102-O), (e) output instructions to communicate with at least one node 102 (e.g., 102-A, 102-B, 102-C, and/or at least one other node), (f) authenticate position information obtained from at least one navigation system 114, (g) authenticate time information obtained from at least one time system (e.g., a GNSS device), (h) output instructions to the at least one node to support controlling communications with the node through the at least one node 102 (e.g., 102-A, 102-B, 102-C, and/or at least one other node), (i) utilize the position information of the node 102 (e.g., 102-O) to compute other information, or (j) utilize the time information of the node 102 (e.g., 102-O) to compute additional information. As used throughout, any "BoP 304" or multiple BoPs "304" may generically refer to any suitable BOP or combination of BoPs, such as exemplarily disclosed throughout and/or exemplarily shown in FIGS. 3-10 as having reference numbers of 304-A, 304-A1, 304-A2, 304-B, 304-C, and/or 304-P.

In some embodiments, the node 102 (e.g., 102-O) may be configured to: based at least on the position of the node 102 (e.g., 102-O), the position of the first other node 102 (e.g., 102-A), and the position of the second other node 102 (e.g., 102-B), determine the first angle and the second angle. In some embodiments, the node 102 (e.g., 102-O) may be configured to: based at least on at least one of (a) the position of the node 102 (e.g., 102-O), (b) positions of the first other node 102 (e.g., 102-A) and the second other node 102 (e.g., 102-B), or (c) at least one time reported by any of the first other node 102 (e.g., 102-A) and the second other node 102 (e.g., 102-B), determine a time offset between the node 102 (e.g., 102-O) and a synchronized time (e.g., a network time) of the first other node 102 (e.g., 102-A) and/or the second other node 102 (e.g., 102-B). In some embodiments, the node 102 (e.g., 102-O) may be configured to: based at least on the first angle measurement of the first angle, the second angle measurement of the second angle, the first angle, and the second angle, determine a time offset between the node 102 (e.g., 102-O) and a synchronized time (e.g., a network time) of the first other node 102 (e.g., 102-A) and/or the second other node 102 (e.g., 102-B).

In some embodiments, the node 102 (e.g., 102-O) may be configured to: based at least on the first BoP 304 (e.g., 304-A or 304-A1) and at least one other BoP 304 (e.g., 304-B, 304-C, and/or 304-A2), determine the position of the node 102 (e.g., 102-O).

In some embodiments, the node 102 (e.g., 102-O) may be configured to: receive at least one third other node signal from a third other node 102 (e.g., 102-C), wherein each of the at least one third other node signal being a signal from the third other node 102 (e.g., 102-C); obtain or determine a position of the third other node 102 (e.g., 102-C) based at least on one or more of the at least one third other node signal; based at least on positions of (a) the first other node 102 (e.g., 102-A) or the second other node 102 (e.g., 102-B) and (b) the position of the third other node 102 (e.g., 102-C), obtain or determine a third angle measurement of a third angle between the node 102 (e.g., 102-O) and the third other node 102 (e.g., 102-C); based at least on (a) the first angle measurement or the second angle measurement, (b) the third angle measurement, and (c) the positions of (1) the first other node 102 (e.g., 102-A) or the second other node 102 (e.g., 102-B) and (2) the third other node 102 (e.g., 102-C), determine a second BoP 304 (e.g., 304-B or 304-C), the second BoP 304 (e.g., 304-B or 304-C) containing points of possible positions of the node 102 (e.g., 102-O); and/or based at least on the first BoP 304 (e.g., 304-A) and the second BoP 304 (e.g., 304-B or 304-C), determine the position of the node 102 (e.g., 102-O). In some embodiments, the node 102 (e.g., 102-O) may be configured to: receive at least one fourth other node signal from a fourth other node 102, wherein each of the at least one fourth other node signal being a signal from the fourth other node 102; obtain or determine a position of the fourth other node 102 based at least on one or more of the at least one fourth other node signal; based at least on positions of (a) the first other node 102 (e.g., 102-A), the second other node 102 (e.g., 102-B), or the third other node 102 (e.g., 102-C) and (b) the position of the fourth other node 102, obtain or determine a fourth angle measurement of a fourth angle between the node 102 (e.g., 102-O) and the fourth other node 102; based at least on (a) the first angle measurement, the second angle measurement, or the third angle measurement, (b) the fourth angle measurement, and (c) the positions of (1) the first other node 102 (e.g., 102-A), the second other node 102 (e.g., 102-B), or the third other node 102 (e.g., 102-C) and (2) the fourth other node 102, determine a third boundary of position (BoP) 304, the third BoP 304 containing points of possible positions of the node 102 (e.g., 102-O); and/or based at least on the first BoP 304 (e.g., 304-A), the second BoP 304 (e.g., 304-B or 304-C), and the third BoP 304, determine the position of the node 102 (e.g., 102-O).

In some embodiments, the node 102 (e.g., 102-O) may be configured to: receive the at least one first other node signal during a first time interval from the first other node, wherein each of the at least one first other node signal being a signal from the first other node 102 (e.g., 102-A) during the first time interval; obtain or determine the position of the first other node 102 (e.g., 102-A) during the first time interval based at least on the one or more of the at least one first other node signal during the first time interval; receive the at least one second other node signal during the first time interval from the second other node 102 (e.g., 102-B), wherein each of the at least one second other node signal being a signal from the second other node 102 (e.g., 102-B) during the first time interval; obtain or determine the position of the second other node 102 (e.g., 102-B) during the first time interval based at least on one or more of the at least one second other node signal during the first time interval; based at least on the positions of the first other node 102 (e.g., 102-A) and the second other node 102 (e.g., 102-B) during the first time interval, obtain or determine (a) the first angle measurement of the first angle between the node 102 (e.g., 102-O) and the first other node 102 (e.g., 102-A) during the first time interval and (b) the second angle measurement of the second angle between the node 102 (e.g., 102-O) and the second other node 102 (e.g., 102-B) during the first time interval; and/or based at least on the first angle measurement, the second angle measurement, and the positions of the first other node 102 (e.g., 102-A) and the second other node 102 (e.g., 102-B) during the first time interval, determine the first BoP 304 (e.g., 304-A1), the first BoP 304 (e.g., 304-A1) containing points of possible positions of the node during the first time interval. In some embodiments, the node 102 (e.g., 102-O) may be configured to perform at least one iteration of: receive at least one subsequent first other node signal during a subsequent time interval from the first other node 102 (e.g., 102-A), wherein each of the at least one subsequent first other node signal being a signal from the first other node 102 (e.g., 102-A) during the subsequent time interval; obtain or determine a subsequent position of the first other node 102 (e.g., 102-A) during the subsequent time interval based at least on one or more of the at least one subsequent first other node signal during the subsequent time interval; receive at least one subsequent second other node signal during the subsequent time interval from the second other node 102 (e.g., 102-B), wherein each of the at least one subsequent second other node signal being a signal from the second other node 102 (e.g., 102-B) during the subsequent time interval; obtain or determine a subsequent position of the second other node 102 (e.g., 102-B) during the subsequent time interval based at least on one or more of the at least one subsequent second other node signal during the subsequent time interval; based at least on the subsequent positions of the first other node 102 (e.g., 102-A) and the second other node 102 (e.g., 102-B) during the subsequent time interval, obtain or determine (a) a subsequent first angle measurement of a subsequent first angle between the node 102 (e.g., 102-O) and the first other node 102 (e.g., 102-A) during the subsequent time interval and (b) a subsequent second angle measurement of a subsequent second angle between the node 102 (e.g., 102-O) and the second other node 102 (e.g., 102-B) during the subsequent time interval; based at least on the subsequent first angle measurement, the subsequent second angle measurement, and the subsequent positions of the first other node 102 (e.g., 102-A) and the second other node 102 (e.g., 102-B) during the subsequent time interval, determine a subsequent BoP 304 (e.g., 304-A2), the subsequent BoP 304 (e.g., 304-A2) containing points of possible positions of the node 102 (e.g., 102-O) during the subsequent time interval; and/or based at least on the first BoP 304 (e.g., 304-A1) and the subsequent BoP 304 (e.g., 304-A2), determine a subsequent position of the node 102 (e.g., 102-O) during the subsequent time interval. In some embodiments, the node 102 (e.g., 102-O), during the performance of the at least one iteration, may be configured to: based at least on the subsequent position of the node 102 (e.g., 102-O), at least one of (a) output instructions to adjust the communication parameters, (b) output instructions to adjust the operational parameters of the at least one of the at least one sub-system or the at least one sensor 112 of the node, (c) output instructions to display the at least one graphical image including information of the position of the node, (d) output instructions to navigate the node, (e) output instructions to communicate with the at least one node, (f) authenticate the position information obtained from the at least one navigation system 114, (g) authenticate the time information obtained from the at least one time system, (h) output instructions to the at least one node to support controlling the communications with the node 102 (e.g., 102-O) through the at least one node, (i) utilize the position information of the node 102 (e.g., 102-O) to compute other information, or (j) utilize the time information of the node 102 (e.g., 102-O) to compute additional information.

In some embodiments, the node 102 (e.g., 102-O) does not transmit any radiofrequency signal during a time interval spanning performance of: the receipt of the at least one first other node signal; the obtaining or determination of the position of the first other node 102 (e.g., 102-A); the receipt of the at least one second other node signal; the obtaining or determination of the position of the second other node 102 (e.g., 102-B); the obtaining or determination of (a) the first angle measurement of the first angle and (b) the second angle measurement of the second angle; the determination of the first BoP 304 (e.g., 304-A or 304-A1); and the determination of the position of the node 102 (e.g., 102-O).

In some embodiments, the node 102 (e.g., 102-O) does not transmit any two-way timing and ranging (TWTR) interrogation message or TWTR response message during a time interval spanning performance of: the receipt of the at least one first other node signal; the obtaining or determination of the position of the first other node 102 (e.g., 102-A); the receipt of the at least one second other node signal; the obtaining or determination of the position of the second other node 102 (e.g., 102-B); the obtaining or determination of (a) the first angle measurement of the first angle and (b) the second angle measurement of the second angle; the determination of the first BoP 304 (e.g., 304-A or 304-A1); and the determination of the position of the node 102 (e.g., 102-O).

In some embodiments, the node 102 (e.g., 102-O) is a vehicle, wherein the node 102 (e.g., 102-O) knows a velocity and/or an altitude of the node 102 (e.g., 102-O).

In some embodiments, at least one node 102 (e.g., 102-O, 102-A, 102-B, 102-C, and/or 102-D) of the node 102 (e.g., 102-O), the first pair of nodes 102 (e.g., 102-A, 102-B, 102-C, and/or 102-D), or the second pair of nodes (e.g., 102-A, 102-B, 102-C, and/or 102-D) is a vehicle.

In some embodiments, the node 102 (e.g., 102-O) is in a contested environment.

In some embodiments, the node 102 (e.g., 102-O) may be configured to: based at least on known approximate position information of the node 102 (e.g., 102-O) and at least one BoP 304, determine the position information of the node 102 (e.g., 102-O) and optionally the time information of the node 102 (e.g., 102-O). In some embodiments, the known approximate position information of the node 102 (e.g., 102-O) is known based at least on at least one of inertial coasting or position information obtained from at least one navigation system 114 (e.g., at least one GNSS device, at least one altimeter, at least one radar, at least one LIDAR, at least one electro-optical/infrared (EO/IR) sensor, at least one magnetic anomaly sensor, at least one terrain database, at least one distance measuring equipment (DME), at least one tactical air navigation system (TACAN), at least one long-range navigation (LORAN) system, and/or at least one inertial navigation system (e.g., at least one Ring Laser Gyro, at least one Inertial Measurement Unit (IMU), at least one Fiber Optic Gyro (FOG), and/or at least one Micro-Electromechanical System (MEMS)). In some embodiments, the position information of the node 102-O and/or the other node(s) (e.g., 102-A, 102-B, and/or 102-C) is known by the node 102-O based at least on a fixed position of the one node or the other node(s), a priori knowledge of a motion plan of the node or the other node(s), or an estimate based at least on equations of motion.

In some embodiments, the node 102 (e.g., 102-O) may be configured to: based at least on a measured altitude of the node 102 (e.g., 102-O) and at least one BoP 304, determine three-dimensional position information of the node 102 (e.g., 102-O) and optionally the time information of the node 102 (e.g., 102-O).

In some embodiments, the system 100 is or includes a network comprising the node 102 (e.g., 102-O) and at least one other node 102 (e.g., 102-A, 102-B, and/or 102-C).

In some embodiments, the node 102 (e.g., 102-O) may be configured to: based at least on one or more BoPs 304, determine at least one of a velocity, an acceleration, a jerk, an attitude, or an altitude of the node 102 (e.g., 102-O).

Referring now to FIGS. 2-7, an exemplary embodiment of the system 100 of FIG. 1, according to the inventive concepts disclosed herein, is depicted. As shown, in FIG. 2, the system 100 may include nodes 102-O (which may refer to an ownship node), 102-A, 102-B, and 102-C. FIGS. 2-7, and descriptions thereof, show how the node 102-O may calculate position based at least on angular measurements to three other nodes 102-A, 102-B, and 102-C having known positions.

In some embodiments, the node 102-O may have unknown position (e.g., an unknown horizontal position) and/or unknown time; in some embodiments, the node 102-O may know an altitude (e.g., a pressure altitude). In some embodiments, two or more of the other nodes 102-A, 102-B, and 102-C may be network nodes that are time synchronized. The node 102-O may be configured to determine positions (e.g., fixed or moving positions (e.g., the other nodes 102-A, 102-B, and 102-C transmit position information (e.g., notionally WGS-84 (or equivalent) and/or pressure altitude)) of the other nodes 102-A, 102-B, and 102-C. In some embodiments, position and time bias from the other nodes 102-A, 102-B, and 102-C can be computed, by making angular measurements to the other nodes 102-A, 102-B, and 102-C. Typically, transmissions from the other nodes 102-A, 102-B, and 102-C would have a time error with time not being initially synchronized between the node 102-O and the other nodes 102-A, 102-B, and 102-C.

In some embodiments, the node 102-O can make angular measurements via sub-systems that can determine angles to the other nodes 102-A, 102-B, and 102-C. For example, the node 102-O may include multiple receive antennas configured to determine angles of arrival for signals transmitted by the other nodes 102-A, 102-B, and 102-C, and/or the node 102-O may include visual sensors, radar, LIDAR, FLIR, etc.

Figure 2:
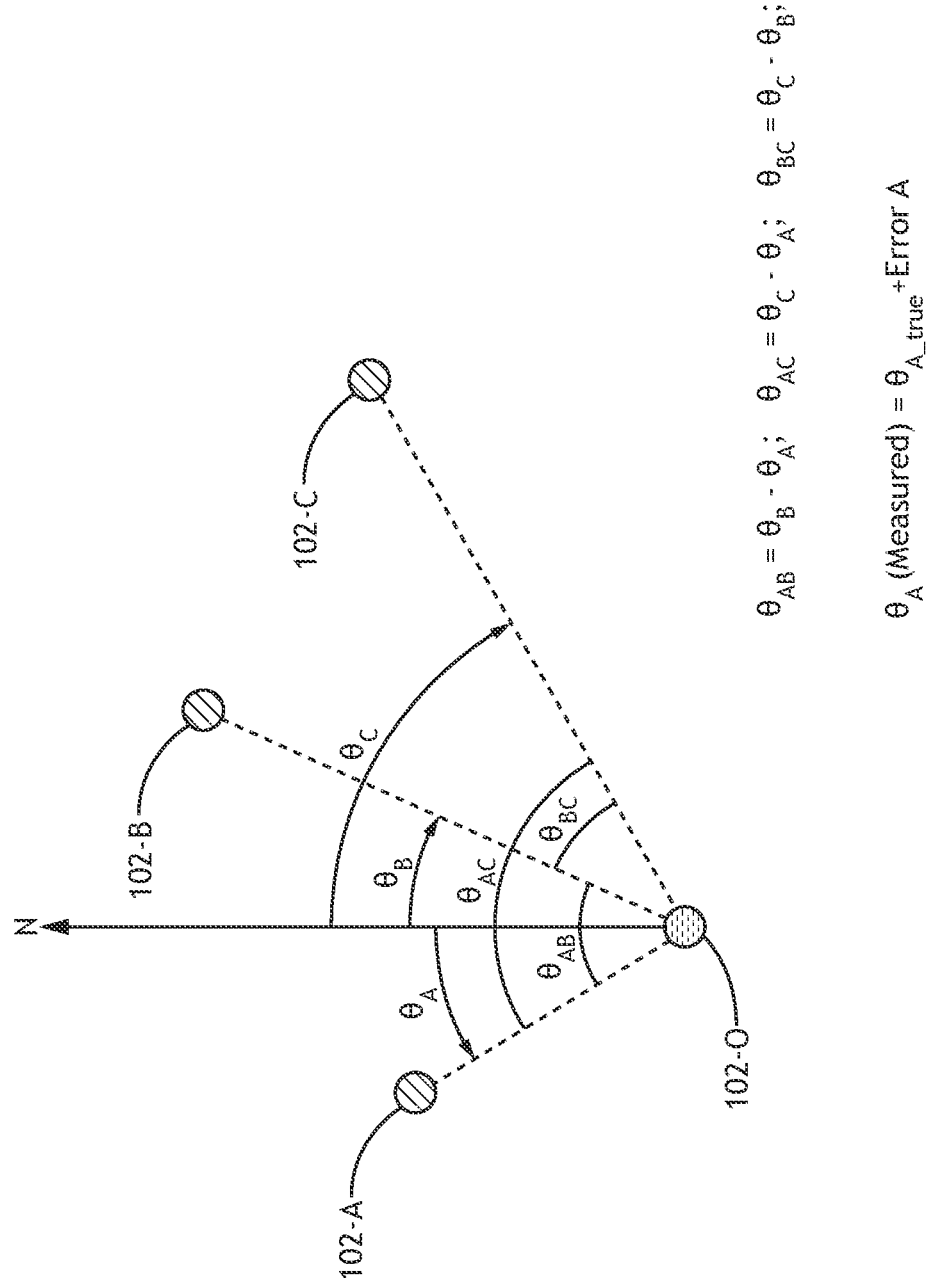
FIG. 2 is a view of an exemplary embodiment of the system of FIG. 1 according to the inventive concepts disclosed herein.

FIG. 2 shows a first angle $\theta_A$ between the node 102-O and the first other node 102-A; a second angle $\theta_B$ between the node 102-O and the second other node 102-B; a third angle $\theta_C$ between the node 102-O and the third other node 102-C; a first arc angle $\theta_{AB}$ between the direction from node 102-O to the first other node 102-A (first angle $\theta_A$) and the direction from node 102-O to the second other node 102-B (second angle $\theta_B$), which can be calculated as $\theta_{AB}=\theta_B-\theta_A$; a second arc angle $\theta_{AC}$ between the direction from node 102-O to the first other node 102-A (first angle $\theta_A$) and the direction from node 102-O to the third other node 102-C (third angle $\theta_C$), which can be calculated as $\theta_{AC}=\theta_C-\theta_A$; and a third arc angle $\theta_{BC}$ between the direction from node 102-O to the second other node 102-B (second angle $\theta_B$) and the direction from node 102-O to the third other node 102-C (third angle $\theta_C$), which can be calculated as $\theta_{BC}=\theta_C-\theta_B$. As depicted in the example illustrated in FIG. 2, where nodes 102-O, 102-A, 102-B, and 102-C are in the same horizontal plane, where the angles $\theta_A$, $\theta_B$, and $\theta_C$ are shown referenced to north (which is depicted as up illustrated with arrow with the label "N" on FIG. 2), $\theta_A$ is approximately −20 degrees, $\theta_B$ is approximately +25 degrees, and $\theta_C$ is approximately +60 degrees. Thus, $\theta_{AB}$ as depicted in FIG. 2 is approximately 45 degrees, which can be computed as $\theta_{AB}=\theta_B-\theta_A=25$ degrees−(−20 degrees)=45 degrees. $\theta_{AC}$ as depicted in FIG. 2 is approximately 80 degrees, which can be computed as $\theta_{AC}=\theta_C-\theta_A=60$ degrees−(−20 degrees)=80 degrees. $\theta_{BC}$ as depicted in FIG. 2 is approximately 35 degrees, which can be computed as $\theta_{BC}=\theta_C-\theta_B=60$ degrees−(25 degrees)=35 degrees. Accordingly, a measurement of the first angle $\theta_A$ may be represented by the formula, $\theta_A$ (measured)=$\theta_{A\_true}$+ Error_A; a measurement of the second angle $\theta_B$ may be represented by the formula, $\theta_B$ (measured)=$\theta_{B\_true}$+Error_B; and a measurement of the third angle $\theta_C$ may be represented by the formula, $\theta_C$(measured)=$\theta_{C\_true}$+Error_C. In some embodiments, Error_A, Error_B, and Error_C are approximately equal (e.g., as a result of mostly bias error with limited measurement variation), then the angular error biases essentially cancel from $\theta_{AB}$, $\theta_{AC}$, and $\theta_{BC}$, such that said errors may be negligible for performance of operations disclosed throughout.

In some embodiments, the node 102-O may measure angles to the other nodes 102-A, 102-B, and 102-C(e.g., which may be time synchronized and be correct relatively for the angles measured between the other nodes 102-A, 102-B, and 102-C). In some embodiments, the other nodes 102-A, 102-B, and 102-C may not be time synchronized.

The angular difference of the other nodes 102-A and 102-B, the other nodes 102-B and 102-C, and the other nodes 102-A and 102-C as observed from the node 102-O may be computed using any suitable angle measurement technique.

In some embodiments, angle measurements may be biased by an angular amount related to an amount of clock bias between the nodes. For example, if the other nodes 102-A, 102-B, and 102-C are time synchronized but the node 102-O is not time synchronized, for some angle measurement techniques the absolute angle measured from the node 102-O to the other nodes 102-A, 102-B, and 102-C may be in error by a same or similar angle bias. However, the absolute difference in angles between the other nodes 102-A and 102-B, between the other nodes 102-B and 102-C, and between the other nodes 102-A and 102-C may be preserved (e.g., $\theta_{AB}$, $\theta_{BC}$, and $\theta_{AC}$, may not be affected by a time bias that could affect the absolute but not relative angle measurements for some angle measurement techniques). For example, if the angular differences between two or more other nodes (e.g., 102-A, 102-B, and 102-C) at known positions are available, then the position of the node 102-O and a time bias can also be determined, such as described herein.

Figure 3:
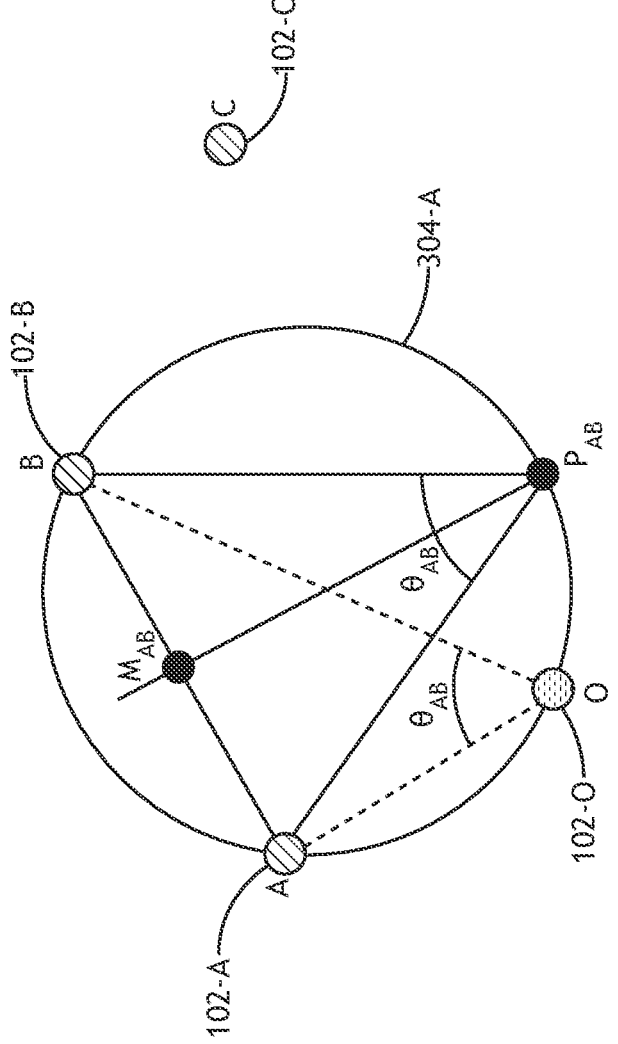
FIG. 3 is a view of an exemplary embodiment of the system of FIG. 1 according to the inventive concepts disclosed herein.

Referring now to FIG. 3, an exemplary embodiment of the system 100 of FIG. 1, according to the inventive concepts disclosed herein, is depicted. As shown, in FIG. 3, the system 100 may include nodes 102-O (which may refer to an ownship node), 102-A, 102-B, and 102-C. For example, the node 102-O's calculation of position based at least on angular measurements to three other nodes 102-A, 102-B, and 102-C having known positions may include determining a first BoP 304-A that contains possible positions of the node 102-O based at least on angles measured to the other nodes 102-A and 102-B.

As exemplarily shown in FIG. 3, the first BoP 304-A may be represented as a circle in a plane that contains the node 102-O and the other nodes 102-A and 102-B. Such plane of the node 102-O and the other nodes 102-A and 102-B also contains the midpoint MAB of the line between the other nodes 102-A and 102-B and point $P_{AB}$, which is perpendicular to line segment AB in the plane of the node 102-O and the other nodes 102-A and 102-B. The node 102-O may be configured to determine the location of the line segment AB based on the position of the other nodes 102-A and 102-B being known by the node 102-O. While the first BoP 304-A may be three-dimensional surface, an intersection of (a) the first BoP 304-A and (b) the plane of the node 102-O and the other nodes 102-A and 102-B, provides the represented two-dimensional circle corresponding to the first BoP 304-A, as exemplarily shown. The first BoP 304-A may represent points where the node 102-O may be positioned where the angle $AP_{AB}B=\theta_{AB}$. It is worth noting that the point $P_{AB}$ is in the plane of the node 102-O and the other nodes 102-A and 102-B and, as indicated on the diagram, is along a line perpendicular to the line segment AB, which intersects line segment AB at the mid-point MAB. Additionally, the triangle $AM_{AB}P_{AB}$ forms a right triangle, with the length of line segment $AM_{AB}$ can be readily computed as length of line segment AB divided by 2, with opposite angle ($\theta_{AB}/2$). As such, with knowledge of the triangle $AM_{AB}P_{AB}$, the node 102-O may uniquely identify a circle associated with the first BoP 304-A that includes points A, B, and $P_{AB}$.

Figure 4:
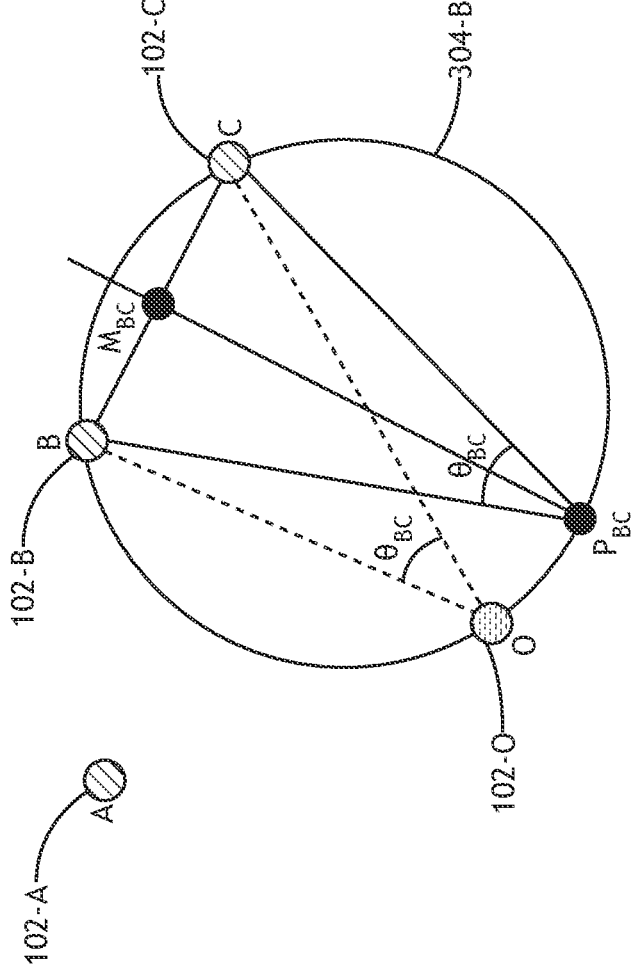
FIG. 4 is a view of an exemplary embodiment of the system of FIG. 1 according to the inventive concepts disclosed herein.

Referring now to FIG. 4, an exemplary embodiment of the system 100 of FIG. 1, according to the inventive concepts disclosed herein, is depicted. As shown, in FIG. 4, the system 100 may include nodes 102-O (which may refer to an ownship node), 102-A, 102-B, and 102-C. For example, the node 102-O's calculation of position based at least on angular measurements to three other nodes 102-A, 102-B, and 102-C having known positions may include determining a second BoP 304-B that contains possible positions of the node 102-O based at least on angles measured to the other nodes 102-B and 102-C.

As exemplarily shown in FIG. 4, the second BoP 304-B may be represented as a circle in a plane that contains the node 102-O and the other nodes 102-B and 102-C. Such plane of the node 102-O and the other nodes 102-B and 102-C also contains the midpoint MBC of the line between the other nodes 102-B and 102-C and point $P_{BC}$, which is perpendicular to line segment BC in the plane of the node 102-O and the other nodes 102-B and 102-C. The node 102-O may be configured to determine the location of the line segment BC based on the position of the other nodes 102-B and 102-C being known by the node 102-O. While the second BoP 304-B may be a three-dimensional surface, an intersection of (a) the second BoP 304-B and (b) the plane of the node 102-O and the other nodes 102-B and 102-C, provides the represented two-dimensional circle corresponding to the second BoP 304-B, as exemplarily shown. The second BoP 304-B may represent points where the node 102-O may be positioned where the angle $BP_{BC}C=\theta_{BC}$. It is worth noting that the point $P_{BC}$ is in the plane of the node 102-O and the other nodes 102-B and 102-C and, as indicated on the diagram, is along a line perpendicular to the line segment BC, which intersects line segment BC at the mid-point MBC. Additionally, the triangle $BM_{BC}P_{BC}$ forms a right triangle, with the length of line segment $BM_{BC}$ readily computed as a length of line segment BC divided by 2, with opposite angle ($\theta_{BC}/2$). As such, with knowledge of the triangle $BM_{BC}P_{BC}$, the node 102-O may uniquely identify a circle associated with the second BoP 304-B that includes points B, C, and $P_{BC}$.

Figure 5:
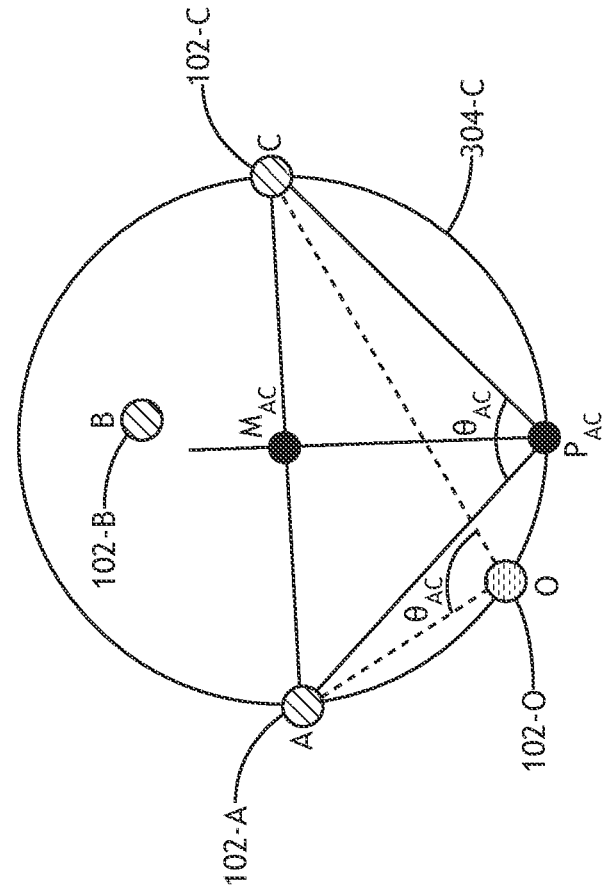
FIG. 5 is a view of an exemplary embodiment of the system of FIG. 1 according to the inventive concepts disclosed herein.

Referring now to FIG. 5, an exemplary embodiment of the system 100 of FIG. 1, according to the inventive concepts disclosed herein, is depicted. As shown, in FIG. 5, the system 100 may include nodes 102-O (which may refer to an ownship node), 102-A, 102-B, and 102-C. For example, the node 102-O's calculation of position based at least on angular measurements to three other nodes 102-A, 102-B, and 102-C having known positions may include, e.g., if necessary (such as if the first BoP 304-A and the second BoP 304-B intersect at multiple points) or to improve an accuracy of the calculation of the position of the node 102-O, determining a third BoP 304-C that contains possible positions of the node 102-O based at least on angles measured to the other nodes 102-A and 102-C.

As exemplarily shown in FIG. 5, the third BoP 304-C may be represented as a circle in a plane that contains the node 102-O and the other nodes 102-A and 102-C. Such a plane of the node 102-O and the other nodes 102-A and 102-C also contains the midpoint $M_{AC}$ of the line between the other nodes 102-A and 102-C and point $P_{AC}$, which is perpendicular to line segment AC in the plane of the node 102-O and the other nodes 102-A and 102-C. The node 102-O may be configured to determine the location of the line segment AC based on the position of the other nodes 102-A and 102-C being known by the node 102-O. The third BoP 304-C may represent points where the node 102-O may be positioned where the angle $AP_{AC}C=\theta_{AC}$. It is worth noting that the point $P_{AC}$ is in the plane of the node 102-O and the other nodes 102-A and 102-C and, as indicated on the diagram, is along a line perpendicular to the line segment AC, which intersects line segment AC at the mid-point $M_{AC}$. Additionally, the triangle $AM_{AC}P_{AC}$ forms a right triangle, with the length of line segment $AM_{AC}$ readily computed as a length of line segment AC divided by 2, with opposite angle ($\theta_{AC}/2$). As such, with knowledge of the triangle $AM_{AC}P_{AC}$, the node 102-O may uniquely identify a circle associated with the third BoP 304-C that includes points A, C, and $P_{AC}$.

Figure 6:
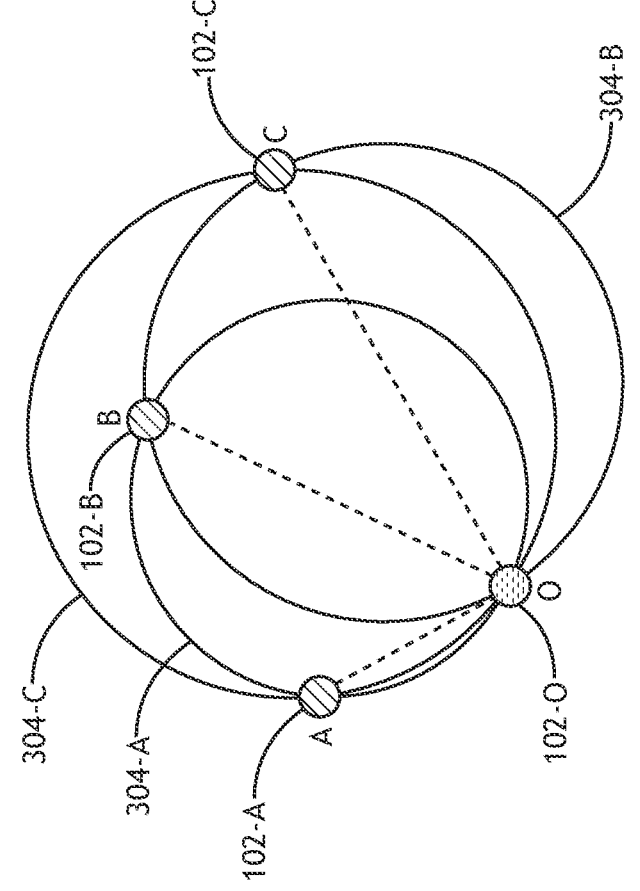
FIG. 6 is a view of an exemplary embodiment of the system of FIG. 1 according to the inventive concepts disclosed herein.

Referring now to FIG. 6, an exemplary embodiment of the system 100 of FIG. 1, according to the inventive concepts disclosed herein, is depicted. As shown, in FIG. 6, the system 100 may include nodes 102-O (which may refer to an ownship node), 102-A, 102-B, and 102-C. For example, the node 102-O's calculation of position based at least on angular measurements to three other nodes 102-A, 102-B, and 102-C having known positions may include determining a position of the node 102-O based at least on the first BoP 304-A, the second BoP 304-B, and/or the third BoP 304-C. For example, an intersection of two or more of the first BoP 304-A, the second BoP 304-B, and the third BoP 304-C may provide a single point in which represents the position of the node 102-A. In some embodiments, it may be desirable to project the BoPs 304-A, 304-B, and/or 304-C into a common plane (e.g., a horizontal plane) to aide in determining position information and/or timing information of the node 102-O, if the node 102-O and the other nodes 102-A, 102-B, and 102-C are not all in a common plane; however, the node may be capable of calculating the position of the node 102-O based on the first BoP 304-A, the second BoP 304-B, and/or the third BoP 304-C without separately projecting the first BoP 304-A, the second BoP 304-B, and/or the third BoP 304-C into a common plane.

In some embodiments, the position of the node 102-O can be determined at the intersection of the BoPs 304-A, 304-B, and/or 304-C, based at least on the measured angles (e.g., even if the angles $\theta_A$, $\theta_B$, and $\theta_C$ are biased in their measurement or determination, as long as the relative angular offsets are properly determined). Some techniques for determining angles $\theta_A$, $\theta_B$, and $\theta_C$ can have errors that are primarily a common bias caused by the clock offset between the ownship node 102-O, and the other time synchronized nodes 102-A, 102-B, and 102-C. When using such techniques to determine angles $\theta_A$, $\theta_B$, and $\theta_C$, the relative angles $\theta_{AB}$, $\theta_{AC}$, and $\theta_{BC}$ can be properly determined when the other nodes 102-A, 102-B, and 102-C are time synchronized. The relative angles $\theta_{AB}$, $\theta_{AC}$, and $\theta_{BC}$ can be properly determined when the other nodes 102-A, 102-B, and 102-C are not time synchronized by using other angle measurement techniques (e.g., RF angle of arrival, sensor visible detection, RADAR, LIDAR, FLIR, etc.) to measure angles (i.e., $\theta_A$, $\theta_B$, and $\theta_C$) from the node 102-O to the other nodes 102-A, 102-B, and 102-C, respectively.

Figure 7:
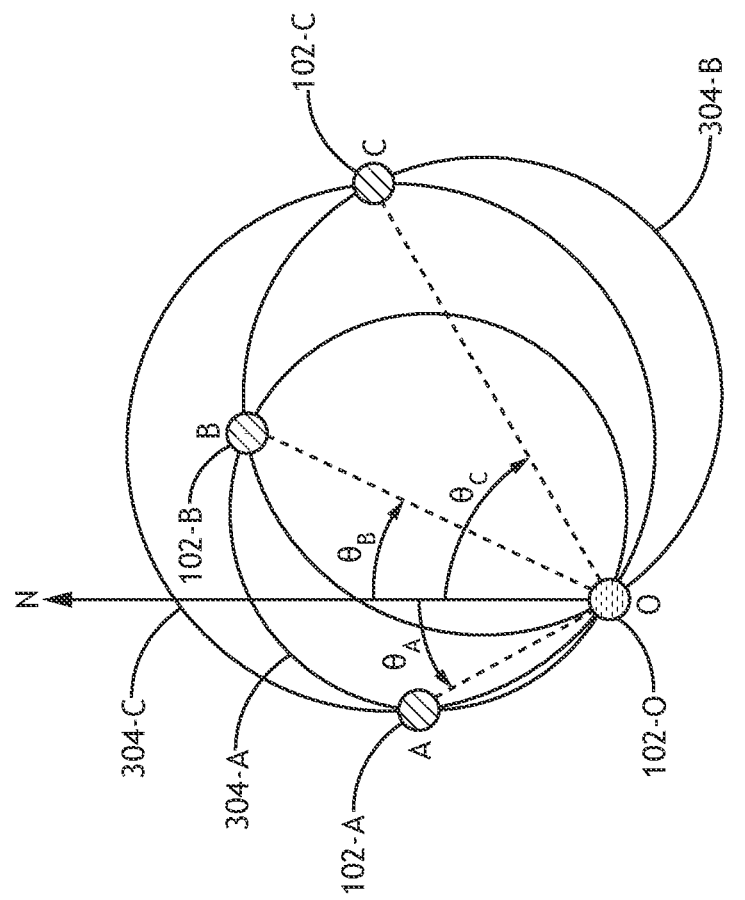
FIG. 7 is a view of an exemplary embodiment of the system of FIG. 1 according to the inventive concepts disclosed herein.

Referring now to FIG. 7, an exemplary embodiment of the system 100 of FIG. 1, according to the inventive concepts disclosed herein, is depicted. As shown, in FIG. 7, for example, the node 102-O's calculation of position based at least on angular measurements to three other nodes 102-A, 102-B, and 102-C having known positions may include determining an actual time offset of the node 102-O from a synchronized time of the other nodes 102-A, 102-B, and 102-C. Since the node 102-O has determined the position of the node 102-O and since the node 102-O knows the positions of the other nodes 102-A, 102-B, and 102-C, the node 102-O may determine the actual angles ($\theta_A$, $\theta_B$, and $\theta_C$) to each of the other nodes 102-A, 102-B, and 102-C, respectively.

For example, based at least on the actual angles $\theta_A$, $\theta_B$, and $\theta_C$, and the corresponding measured angles the other nodes 102-A, 102-B, and 102-C, the node 102-O may determine an angle bias in the measurements, which may be directly related to a time bias in the measurements when the other nodes 102-A, 102-B, and 102-C are time synchronized. Additionally, for example, if the other nodes 102-A, 102-B, and 102-C are not time synchronized or if it is unknown if the other nodes 102-A, 102-B, and 102-C are time synchronized, the actual time offset can be determined based at least on the positions of the node 102-O and the other nodes 102-A, 102-B, and 102-C and at least one time (e.g., if reported by any at least one of the other nodes 102-A, 102-B, or 102-C).

As set forth in the operations performed by the node 102-O with respect to FIGS. 2-7, the node 102-O's operations can readily be implemented by at least one processor (e.g., 108), such as by using at least one Kalman Filter, at least one extended Kalman Filter, at least one least square estimator, and/or at least one other suitable process to estimate ownship states (e.g., position, velocity, time bias, time drift, etc.) in the presence of measurement errors, with multiple measurements taken over time, and/or multiple measurements taken at or near a same time. Similarly, time information (e.g., time bias, clock drift, and higher order derivatives) can also be estimated by using at least one Kalman Filter, at least one extended Kalman Filter, at least one least square estimator, and/or at least one other suitable process.

Figure 8:
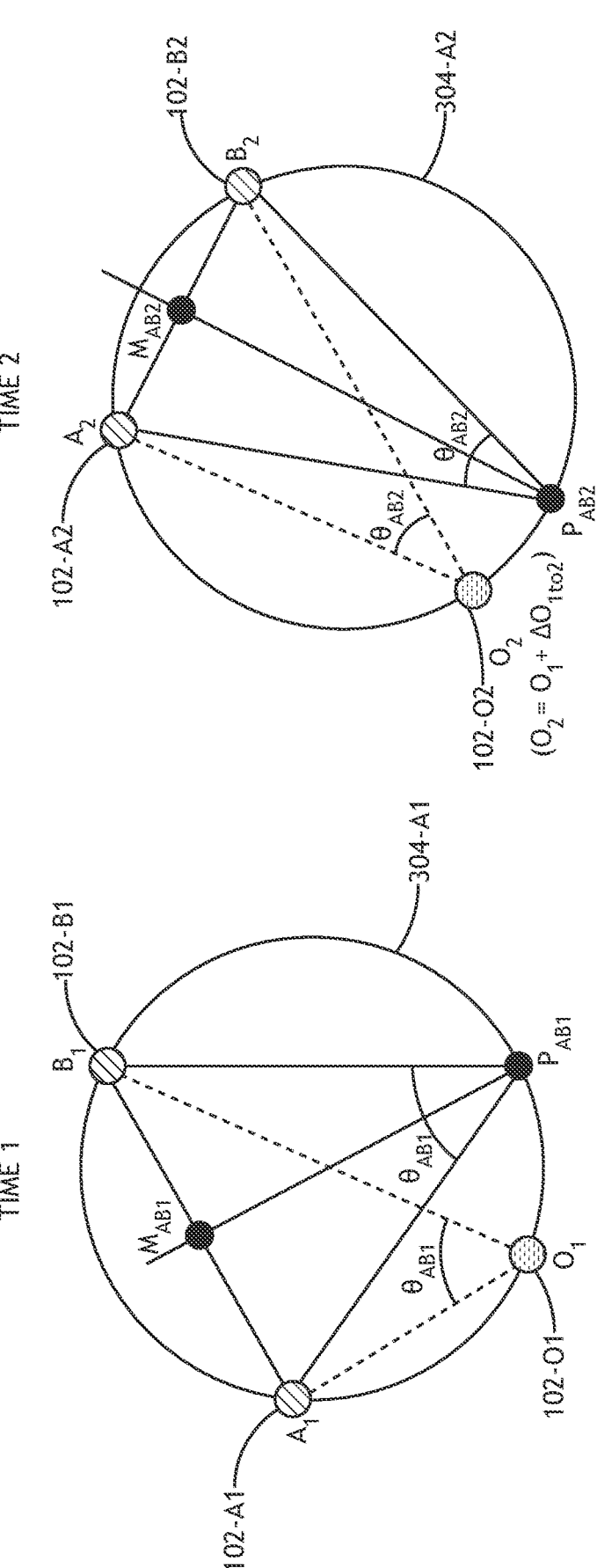
FIG. 8 is a view of an exemplary embodiment of the system of FIG. 1 according to the inventive concepts disclosed herein.
Figure 9:
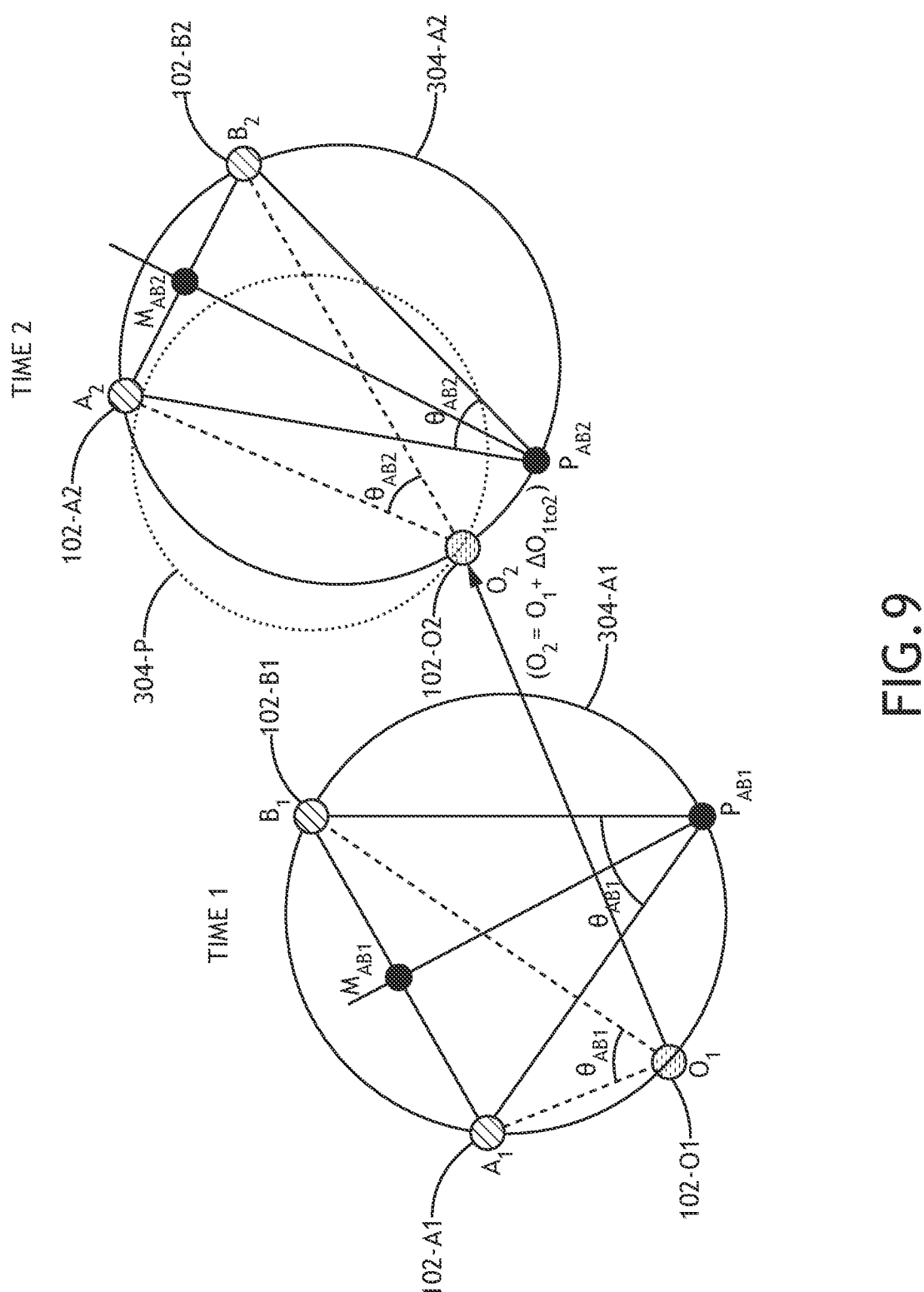
FIG. 9 is a view of an exemplary embodiment of the system of FIG. 1 according to the inventive concepts disclosed herein.

Referring now to FIGS. 8-9, an exemplary embodiment of the system 100 of FIG. 1, according to the inventive concepts disclosed herein, is depicted. As shown in FIGS. 8-9, the system 100 may include nodes 102-O (e.g., shown as 102-O1 during a first time interval and shown as 102-O2 during a second time interval), 102-A (e.g., shown as 102-A1 during the first time interval and shown as 102-A2 during the second time interval) and 102-B (e.g., shown as 102-B1 during the first time interval and shown as 102-B2 during the second time interval). FIGS. 8-9, and descriptions thereof, show how the node 102-O may calculate the node's 102-O position (e.g., a position during the first time interval and/or a position during the second time interval) based at least on angular measurements to two or more other nodes 102-A and 102-B having known positions at two or more times (e.g., during the first time interval and during the second time interval) and one or more of the nodes 102-O, 102-A, and 102-B has a different position at the first time interval than it has at the second time interval.

For example, the node 102-O may determine the position of the node 102-O during the first time interval and the position of the node 102-O during the second time interval based at least on a projection 304-P of a first BoP 304-A1 associated with the first time interval (as would similarly apply to other BoPs associated with the first time interval if there are three or more other nodes 102-A, 102-B, and 102-C) forward in time to the second time interval, through use of a change (e.g., delta) in position measured by the node 102-O (e.g., by using inertial velocity or other equivalent means, via the navigation system 114).

The intersection of (a) the projection 304-P (e.g., projected forward in time to during the second time interval, and projected into the plane of the node 102-O and the other nodes 102-A and 102-B during the second time interval) of the first BoP 304-A1 and (b) the second BoP 304-A2 associated with the second time interval, may uniquely identify (e.g., by the node 102-O) the position of the node 102-O during the second time interval. Similarly, the node 102-O may determine the position of the node during the first time interval. Further, the node 102-O may determine a time bias of the node 102-O, such as based at least on a time-synchronization of the other nodes 102-A and 102-B.

As exemplarily shown in FIG. 9, for a situation where (a) there are two other nodes 102-A and 102-B, (b) there are angular measurements of the two other nodes 102-A and 102-B at two times (e.g., during the first time interval and the second time interval), and (c) the node 102-O knows the positions of and angular measurements of the two other nodes 102-A and 102-B at multiple times (e.g., during the first time interval and the second time interval) based at least on reported positions by the other nodes 102-A and 102-B, the node 102-O may determine a change ($\Delta O_{1to2}$) in position between the first time interval and the second time interval. With respect to FIG. 9, $\Delta O_{1to2}$ is a change in position of the node 102-O between the first time interval and the second time interval. With respect to FIG. 9, if $\Delta O_{1to2=0}$, then no projection of the BoP from the first time interval to the second time interval (or vice versa) is needed.

The first node 102-O may project (a) the first BoP 304-A1 associated with the first time interval to the second time interval $\Delta O_{1to2}$ (such that all points on the first BoP 304-A1 move by $\Delta O_{1to2}$) and/or (b) the first BoP 304-A1 associated with the first time interval into the plane of the node 102-O2 and the other nodes 102-A2 and 102-B2 during the second time interval if nodes are in a different planes in the first time interval and the second time interval, such that the projected first BoP 304-P (associated with the first BoP 304-A1) and the second BoP 304-A2 share a common time and common plane.

The intersection(s) of the projected first BoP 304-P (e.g., associated with the first BoP 304-A1 associated with the first time interval) and the second BoP 304-A2 (e.g., associated with the second time interval) would typically be two points of intersection. In some embodiments, the node 102-O may determine the solution for the position of the node 102-O at various time points in many ways, such as: (a) one of the points of intersection can be eliminated by taking measurements and determining a third BoP 304 during a third time interval (e.g., at a time 3) and by extrapolating (and projecting, if necessary) the first BoP 304-A1 (e.g., determined during the first time interval) and the second BoP 304-A2 (e.g., determined during the second time interval) forward and into the plane of the node 102-O and the other nodes during the third time interval (e.g., time 3); (b) using an initial estimate of the position of the node 102-O (e.g., during the first time interval); and/or (c) using knowledge that the measurement angle bias remains relatively constant between angle measurements made during the first time interval and the second time interval.

Figure 10:
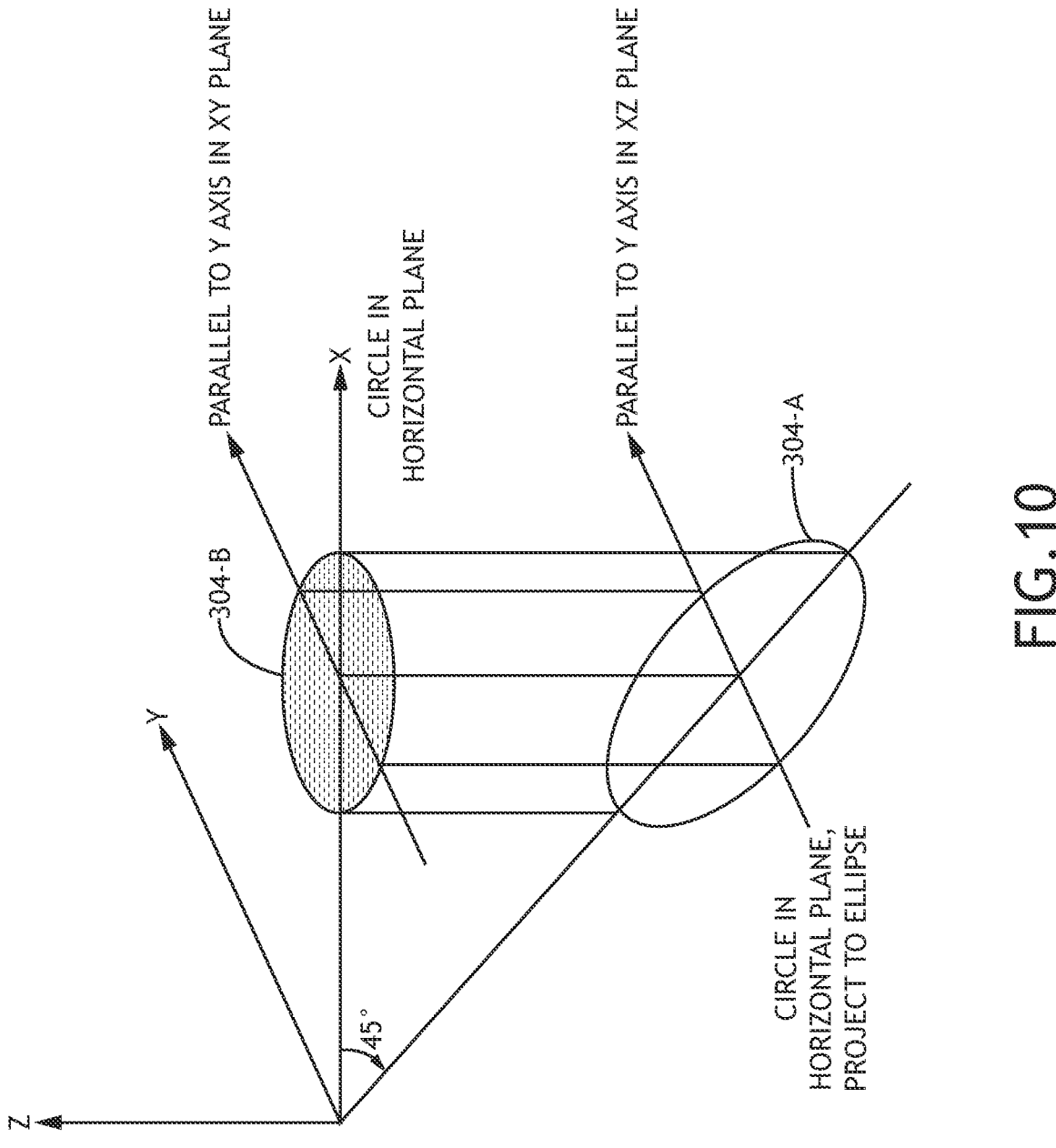
FIG. 10 is a view of an exemplary embodiment of the system of FIG. 1 according to the inventive concepts disclosed herein.

This disclosure is not limited to having all nodes (e.g., 102-O, 102-O1, 102-O2, 102-A, 102-A1, 102-A2, 102-B, 102-B1, 102-B2, and/or 102-C) in a common plane, but it has been exemplarily illustrated in FIGS. 2-9 with nodes depicted in a common plane for diagram simplicity and clarity. Referring now to FIG. 10, an exemplarily technique is shown to project BoPs 304 (e.g., 304-A, 304-A1, 304-A2, 304-B, and/or 304-C) to a common plane, that were determined from angular measurements between nodes (e.g., 102-O, 102-O1, 102-O2, 102-A, 102-A1, 102-A2, 102-B, 102-B1, 102-B2, and/or 102-C) that are not all within a common plane. Such a projection of the BoPs 304 to a common plane may be done to simplify determining the intersection point(s) of BoPs 304. As shown in FIG. 10, axes x, y, and z form a right-handed local level coordinate system, where x is in a horizontal plane, y is in a horizontal plane perpendicular to x, and z is perpendicular to the x and the y axis at their point of intersection. When identifying the intersection point(s) of BoPs (e.g., 304A, 304B), one may project the BoPs into a common plane (e.g., a horizontal plane). The projection of a circle (e.g., 304-B) in one plane, to another plane often results in an elliptical BoP (e.g., 304A in FIG. 10); although, it could also take on other shapes (e.g., a line segment) when projected to another plane. The node 102-O does not necessarily need to project a BoP of a first plane into to a common plane having one or more other BoPs. The node 102-O can also solve for the position of the node 102-O based at least on the BoPs, directly, without intermediate projection steps.

Referring, generally, to FIGS. 1-10, some embodiments include the node 102-O solving for position information of the node 102-O. For example, ownship node position information may include one-dimensional (1D), two-dimensional (2D), or three-dimensional (3D) position(s), velocity(ies), acceleration(s), jerk(s), etc. While an example method solves for position, use of at least one position filter and/or estimator (e.g., Kalman Filter, Extended Kalman filter, and/or least squares estimator) allows for computing such other states (e.g., derivative states). Some embodiments include the node 102-O solving for time information of the node 102-O. For example, ownship node time information may include time information determined from and/or relative to other node(s), such as time bias(es). With multiple measurements over time, using at least one appropriate time filter and/or estimator, the node 102-O can determine higher order clock states (e.g., time drift(s), rate(s) of change of time, and higher order derivative(s) of time). In some embodiments, the node 102-O can solve for ownship delta position between measurements made at the same time or at different times (e.g., time 1, time 2, etc.). BoPs may nominally be circular in a plane of the nodes used to determine a BoP for a set of nodes. If the node 102-O is moving, then it can be simplest to compensate BoPs to common point in time, prior to solving for an intersection point position. However, if the node 102-O is stationary in a reference frame, or the node 102-O is moving slow enough, or if the angle measurements for multiple other nodes are made near a same time instant, or if a less precise position solution is acceptable, then it may not be necessary to compensate BoPs to a common time point. It can be desirable to project BoPs into a common plane, prior to determining the solution at the intersection of the BoPs, if it will result in more accurate determination of ownship (e.g., the node 102-O) position information and/or time information.

Some embodiments may provide an alternative means to compute ownship states (e.g., position, velocity, time, time drift, etc.), which may be very useful during GPS- and/or GNSS-denied navigation, or to authenticate and/or validate that a GPS- and/or GNSS-derived position is correct. Some embodiments may be insensitive to relative time differences between an ownship node and other nodes. Some embodiments may be insensitive to angular measurement bias errors. Some embodiments may work without requiring Two-Way Time Transfer and Ranging (TWTR) between the ownship node and other nodes, which may be desirable. Some embodiments may work with various angular measuring equipment, such as with sensors that can measure a direction of arrival (e.g., using RF signals received at multiple antennas), with other EO/IR sensors that can measure angles between nodes (e.g., visually, using active or passive means). For example, passive sensors (e.g., which lack emissions) may include visual sensors, FLIR sensors, and passive listening to other node transmissions to determine angle of arrival of the RF signal. Active sensors (e.g., which may have limited emissions) may include, for example, radar, and LIDAR. Some embodiments allow for use of unbiased or biased angular measurements to a few known other node positions to enable determining own node position and time information, such as without the own node transmitting TWTR messages.

Referring now to FIG. 11, an exemplary embodiment of a method 1100 according to the inventive concepts disclosed herein may include one or more of the following steps.

Additionally, for example, some embodiments may include performing one or more instances of the method 1100 iteratively, concurrently, and/or sequentially. Additionally, for example, at least some of the steps of the method 1100 may be performed in parallel and/or concurrently. Additionally, in some embodiments, at least some of the steps of the method 1100 may be performed non-sequentially.

A step 1102 may include receiving, by a node comprising at least one radio and at least one processor, at least one first other node signal from a first other node, wherein each of the at least one first other node signal being a signal from the first other node.

A step 1104 may include obtaining, by the node, or determine a position of the first other node based at least on one or more of the at least one first other node signal.

A step 1106 may include receiving, by the node, at least one second other node signal from a second other node, wherein each of the at least one second other node signal being a signal from the second other node.

A step 1108 may include obtaining or determining, by the node, a position of the second other node based at least on one or more of the at least one second other node signal.

A step 1110 may include based at least on positions of first other node and the second other node, obtaining or determining, by the node, (a) a first angle measurement of a first angle between the node and the first other node and (b) a second angle measurement of a second angle between the node and the second other node.

A step 1112 may include based at least on the first angle measurement, the second angle measurement, and the positions of the first other node and the second other node, determining, by the node, a first boundary of position (BoP), the first BoP containing points of possible positions of the node.

A step 1114 may include based at least on the first BoP, determining, by the node, a position of the node.

A step 1116 may include based at least on the position of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the position of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

Further, the method 1100 may include any of the operations disclosed throughout.

As will be appreciated from the above, embodiments of the inventive concepts disclosed herein may be directed to a method and a system including a node configured to determine a position of the node and/or a time of the node based at least on angle measurements of transmissions from other nodes.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system, comprising:
a node comprising at least one radio and at least one processor, the node configured to:
receive at least one first other node signal from a first other node, wherein each of the at least one first other node signal being a signal from the first other node;

obtain or determine a position of the first other node based at least on one or more of the at least one first other node signal;

receive at least one second other node signal from a second other node, wherein each of the at least one second other node signal being a signal from the second other node;

obtain or determine a position of the second other node based at least on one or more of the at least one second other node signal;

based at least on positions of first other node and the second other node, obtain or determine (a) a first angle measurement of a first angle between the node and the first other node and (b) a second angle measurement of a second angle between the node and the second other node;

based at least on the first angle measurement, the second angle measurement, and the positions of the first other node and the second other node, determine a first boundary of position (BoP), the first BoP containing points of possible positions of the node;

based at least on the first BoP, determine a position of the node; and based at least on the position of the node, at least one of (a) output instructions to adjust communication parameters, (b) output instructions to adjust operational parameters of at least one of at least one sub-system or at least one sensor of the node, (c) output instructions to display at least one graphical image including information of the position of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

2. The system of claim 1, wherein the node is further configured to: based at least on the position of the node, the position of the first other node, and the position of the second other node, determine the first angle and the second angle.

3. The system of claim 2, wherein the node is further configured to: based at least on at least one of (a) the position of the node, (b) positions of the first other node and the second other node, or (c) at least one time reported by any of the first other node and the second other node, determine a time offset between the node and a synchronized time of the first other node and/or the second other node.

4. The system of claim 2, wherein the node is further configured to: based at least on the first angle measurement of the first angle, the second angle measurement of the second angle, the first angle, and the second angle, determine a time offset between the node and a synchronized time of the first other node and/or the second other node.

5. The system of claim 1, wherein the node is further configured to: based at least on the first BoP and at least one other BoP, determine the position of the node.

6. The system of claim 1, wherein the node is further configured to:

receive at least one third other node signal from a third other node, wherein each of the at least one third other node signal being a signal from the third other node;

obtain or determine a position of the third other node based at least on one or more of the at least one third other node signal;

based at least on positions of (a) the first other node or the second other node and (b) the position of the third other node, obtain or determine a third angle measurement of a third angle between the node and the third other node;

based at least on (a) the first angle measurement or the second angle measurement, (b) the third angle measurement, and (c) the positions of (1) the first other node or the second other node and (2) the third other node, determine a second boundary of position (BoP), the second BoP containing points of possible positions of the node; and based at least on the first BoP and the second BoP, determine the position of the node.

7. The system of claim 6, wherein the node is further configured to:

receive at least one fourth other node signal from a fourth other node, wherein each of the at least one fourth other node signal being a signal from the fourth other node;

obtain or determine a position of the fourth other node based at least on one or more of the at least one fourth other node signal;

based at least on positions of (a) the first other node, the second other node, or the third other node and (b) the position of the fourth other node, obtain or determine a fourth angle measurement of a fourth angle between the node and the fourth other node;

based at least on (a) the first angle measurement, the second angle measurement, or the third angle measurement, (b) the fourth angle measurement, and (c) the positions of (1) the first other node, the second other node, or the third other node and (2) the fourth other node, determine a third boundary of position (BoP), the third BoP containing points of possible positions of the node; and based at least on the first BoP, the second BoP, and the third BoP, determine the position of the node.

8. The system of claim 1, wherein the node is further configured to:

receive the at least one first other node signal during a first time interval from the first other node, wherein each of the at least one first other node signal being a signal from the first other node during the first time interval;

obtain or determine the position of the first other node during the first time interval based at least on the one or more of the at least one first other node signal during the first time interval;

receive the at least one second other node signal during the first time interval from the second other node, wherein each of the at least one second other node signal being a signal from the second other node during the first time interval;

obtain or determine the position of the second other node during the first time interval based at least on one or more of the at least one second other node signal during the first time interval;

based at least on the positions of the first other node and the second other node during the first time interval, obtain or determine (a) the first angle measurement of the first angle between the node and the first other node during the first time interval and (b) the second angle measurement of the second angle between the node and the second other node during the first time interval;

based at least on the first angle measurement, the second angle measurement, and the positions of the first other node and the second other node during the first time interval, determine the first BoP, the first BoP containing points of possible positions of the node during the first time interval; and perform at least one iteration of:

receive at least one subsequent first other node signal during a subsequent time interval from the first other node, wherein each of the at least one subsequent first other node signal being a signal from the first other node during the subsequent time interval;

obtain or determine a subsequent position of the first other node during the subsequent time interval based at least on one or more of the at least one subsequent first other node signal during the subsequent time interval;

receive at least one subsequent second other node signal during the subsequent time interval from the second other node, wherein each of the at least one subsequent second other node signal being a signal from the second other node during the subsequent time interval;

obtain or determine a subsequent position of the second other node during the subsequent time interval based at least on one or more of the at least one subsequent second other node signal during the subsequent time interval;

based at least on the subsequent positions of the first other node and the second other node during the subsequent time interval, obtain or determine (a) a subsequent first angle measurement of a subsequent first angle between the node and the first other node during the subsequent time interval and (b) a subsequent second angle measurement of a subsequent second angle between the node and the second other node during the subsequent time interval;

based at least on the subsequent first angle measurement, the subsequent second angle measurement, and the subsequent positions of the first other node and the second other node during the subsequent time interval, determine a subsequent BoP, the subsequent BoP containing points of possible positions of the node during the subsequent time interval; and based at least on the first BoP and the subsequent BoP, determine a subsequent position of the node during the subsequent time interval.

9. The system of claim 8, wherein, during the performance of the at least one iteration the node is further configured to: based at least on the subsequent position of the node, at least one of (a) output instructions to adjust the communication parameters, (b) output instructions to adjust the operational parameters of the at least one of the at least one sub-system or the at least one sensor of the node, (c) output instructions to display the at least one graphical image including information of the position of the node, (d) output instructions to navigate the node, (e) output instructions to communicate with the at least one node, (f) authenticate the position information obtained from the at least one navigation system, (g) authenticate the time information obtained from the at least one time system, or (h) output instructions to the at least one node to support controlling the communications with the node through the at least one node.

10. The system of claim 1, wherein the node does not transmit any radiofrequency signal during a time interval spanning performance of: the receipt of the at least one first other node signal; the obtaining or determination of the position of the first other node; the receipt of the at least one second other node signal; the obtaining or determination of the position of the second other node; the obtaining or determination of (a) the first angle measurement of the first angle and (b) the second angle measurement of the second angle; the determination of the first BoP; and the determination of the position of the node.

11. The system of claim 1, wherein the node does not transmit any two-way timing and ranging (TWTR) interrogation message or TWTR response message during a time interval spanning performance of: the receipt of the at least one first other node signal; the obtaining or determination of the position of the first other node; the receipt of the at least one second other node signal; the obtaining or determination of the position of the second other node; the obtaining or determination of (a) the first angle measurement of the first angle and (b) the second angle measurement of the second angle; the determination of the first BoP; and the determination of the position of the node.

12. The system of claim 1, wherein the at least one signal is at least one radiofrequency signal.

13. The system of claim 1, wherein the node further comprises at least one sensor.

14. The system of claim 13, wherein the at least one sensor comprises at least one of at least one electro-optical/infrared (EO/IR) sensor, at least one radar sensor, or at least one LIDAR sensor.

15. The system of claim 13, wherein the node further comprises at least one navigation system.

16. The system of claim 15, wherein the at least one navigation system comprises at least one of at least one inertial navigation system, at least one distance measuring equipment (DME), at least one tactical air navigation system (TACAN), at least one long-range navigation (LORAN) system, at least one global navigation satellite system (GNSS), at least one sound navigation and ranging (SONAR) navigation system, at least one magnetic anomaly navigation system, and/or at least one navigation system that uses low earth orbit (LEO) satellites.

17. The system of claim 16, wherein the least one inertial navigation system comprises at least one of at least one Ring Laser Gyro, at least one Inertial Measurement Unit (IMU), at least one Fiber Optic Gyro (FOG), or at least one Micro-Electromechanical System (MEMS).

18. The system of claim 15, wherein the node further comprises at least one antenna.

19. A node, comprising:

at least one radio; and at least one processor, wherein the node is configured to:

receive at least one first other node signal from a first other node, wherein each of the at least one first other node signal being a signal from the first other node;

obtain or determine a position of the first other node based at least on one or more of the at least one first other node signal;

receive at least one second other node signal from a second other node, wherein each of the at least one second other node signal being a signal from the second other node;

obtain or determine a position of the second other node based at least on one or more of the at least one second other node signal;

based at least on positions of first other node and the second other node, obtain or determine (a) a first angle measurement of a first angle between the node and the first other node and (b) a second angle measurement of a second angle between the node and the second other node;

based at least on the first angle measurement, the second angle measurement, and the positions of the first other node and the second other node, determine a first boundary of position (BoP), the first BoP containing points of possible positions of the node;

based at least on the first BoP, determine a position of the node; and based at least on the position of the node, at least one of (a) output instructions to adjust communication parameters, (b) output instructions to adjust operational parameters of at least one of at least one sub-system or at least one sensor of the node, (c) output instructions to display at least one graphical image including information of the position of the node, (d) output instructions to navigate the node, (e) output instructions to communicate with at least one node, (f) authenticate position information obtained from at least one navigation system, (g) authenticate time information obtained from at least one time system, or (h) output instructions to the at least one node to support controlling communications with the node through the at least one node.

20. A method, comprising:

receiving, by a node comprising at least one radio and at least one processor, at least one first other node signal from a first other node, wherein each of the at least one first other node signal being a signal from the first other node;

obtaining, by the node, or determine a position of the first other node based at least on one or more of the at least one first other node signal;

receiving, by the node, at least one second other node signal from a second other node, wherein each of the at least one second other node signal being a signal from the second other node;

obtaining or determining, by the node, a position of the second other node based at least on one or more of the at least one second other node signal;

based at least on positions of first other node and the second other node, obtaining or determining, by the node, (a) a first angle measurement of a first angle between the node and the first other node and (b) a second angle measurement of a second angle between the node and the second other node;

based at least on the first angle measurement, the second angle measurement, and the positions of the first other node and the second other node, determining, by the node, a first boundary of position (BoP), the first BoP containing points of possible positions of the node;

based at least on the first BoP, determining, by the node, a position of the node; and based at least on the position of the node, at least one of (a) outputting, by the node, instructions to adjust communication parameters, (b) outputting, by the node, instructions to adjust operational parameters of at least one of at least one sub-system or at least one sensor of the node, (c) outputting, by the node, instructions to display at least one graphical image including information of the position of the node, (d) outputting, by the node, instructions to navigate the node, (e) outputting, by the node, instructions to communicate with at least one node, (f) authenticating, by the node, position information obtained from at least one navigation system, (g) authenticating, by the node, time information obtained from at least one time system, or (h) outputting, by the node, instructions to the at least one node to support controlling communications with the node through the at least one node.

* * * * *